United States Patent [19]

Crawley

[11] 4,368,462

[45] Jan. 11, 1983

[54] LINE FOLLOWER

[75] Inventor: Barry J. Crawley, Costa Mesa, Calif.

[73] Assignee: Teledyne Industries, Inc., Long Beach, Calif.

[21] Appl. No.: 278,696

[22] Filed: Jun. 29, 1981

Related U.S. Application Data

[63] Continuation of Ser. No. 56,246, Jul. 10, 1979, abandoned.

[51] Int. Cl.³ ............................................. G09G 1/00
[52] U.S. Cl. .......................... 340/723; 340/146.3 AE; 340/146.3 MA; 358/260; 364/515
[58] Field of Search ... 340/723, 146.3 AE, 146.3 MA; 358/260; 364/515

[56] References Cited

U.S. PATENT DOCUMENTS

| | | | |
|---|---|---|---|
| 4,034,344 | 7/1977 | Saraga et al. | 340/146.3 MA |
| 4,155,097 | 5/1979 | Lux | 358/260 X |
| 4,174,514 | 11/1979 | Sternberg | 364/515 X |
| 4,179,684 | 12/1979 | Cheng | 358/260 X |
| 4,189,748 | 2/1980 | Reis | 358/260 X |

Primary Examiner—David L. Trafton
Attorney, Agent, or Firm—Charles H. Schwartz; Ellsworth R. Roston

[57] ABSTRACT

An apparatus and method for providing a digital representation of graphic information on a document wherein the document has been scanned and a signal representative of the graphic information at progressive pixel points on the document has been generated, including storing the signal representative of the graphic information in a memory device through an input path, retrieving the signal representative of the graphic information and feeding the signal through the input path and back to the memory device, providing serial processing and data analysis to the signal representative of the graphic information on a reiterative basis as the signal is repeatedly stored and retrieved and with the serial processing and data analysis including providing pixel arrays from pluralities of adjacent pixels and providing data reduction to center elements when the pixel arrays have desired characteristics and with all of the graphic information in the signal reduced to center elements in accordance with the pixel arrays and with surviving pixels which are not part of an array stored and an attribute representative of the level of survival also stored with the surviving pixels, repeating the above on a reiterative basis using the surviving center elements from the previous step to form the pixel arrays until there are no more surviving pixel arrays so that the stored surviving pixels and their attributes represent the centroids of the lines of the graphic document and the attributes represent the thickness of the lines, and providing pixel arrays from the stored surviving pixels and comparing the pixel arrays with fixed criteria for providing gap filling and elimination of undesired pixels.

27 Claims, 27 Drawing Figures

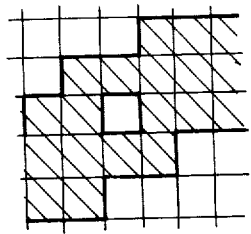
HOLE
PHENOMENON
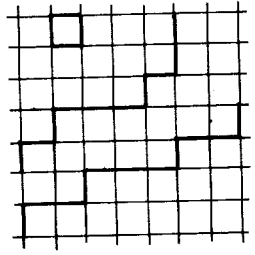
SPOT
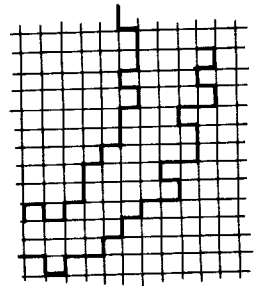
IRREGULAR
EDGES
Fig. 11A
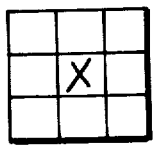
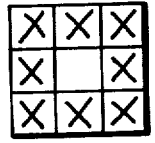
Fig. 11B
Fig. 18

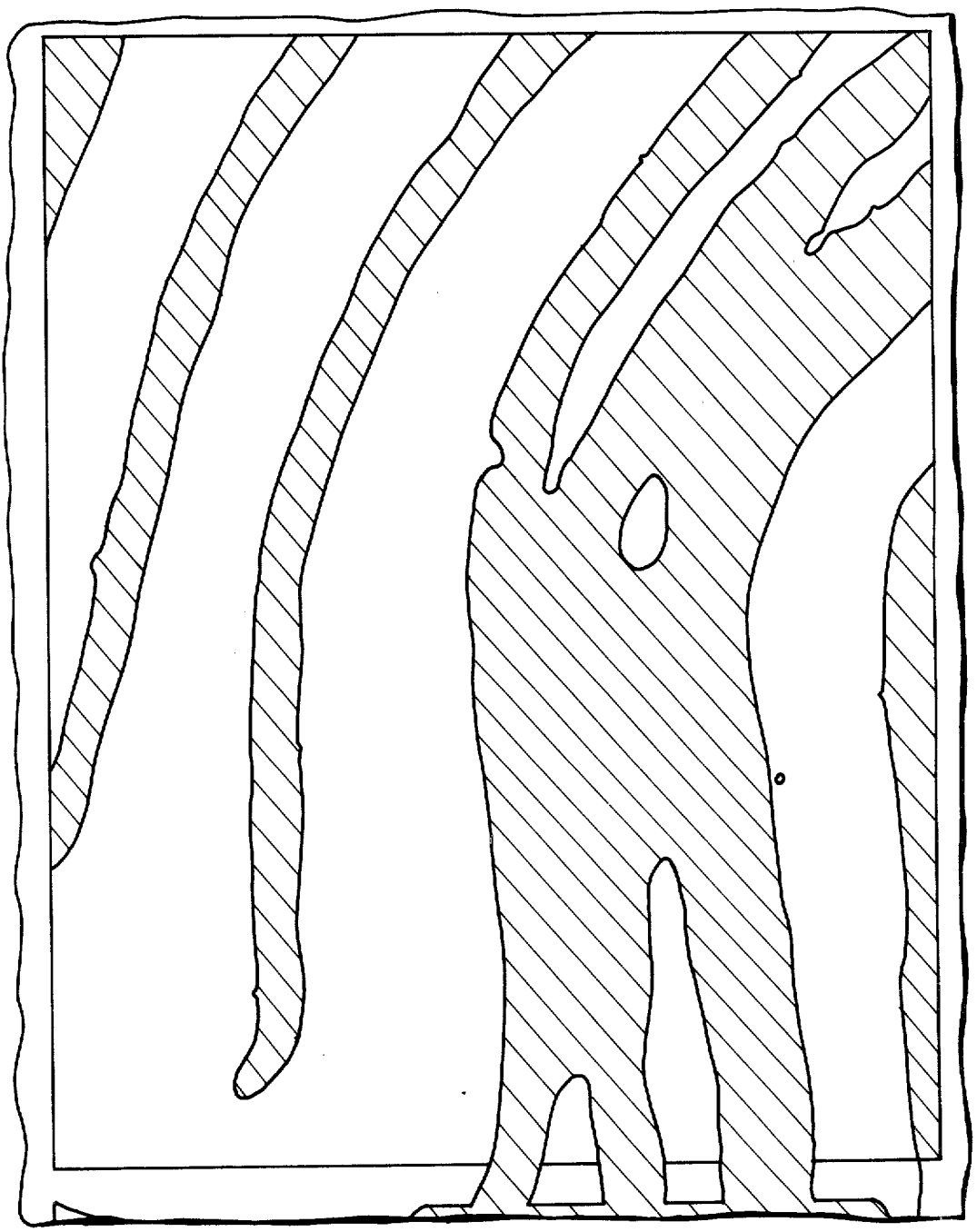
Fig. 12 ANALOG INPUT

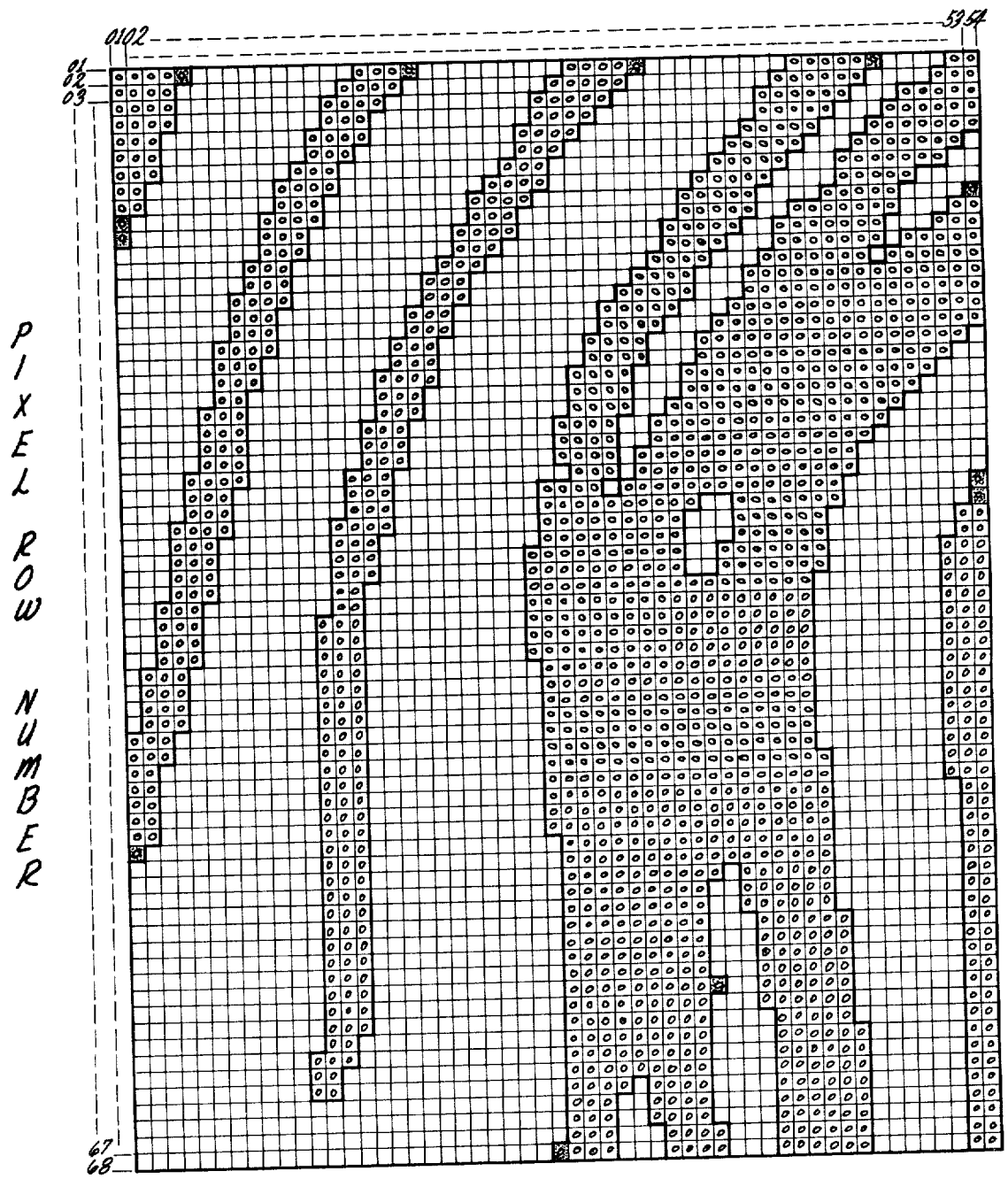
FIG. 13 PIXELIZED IMAGE

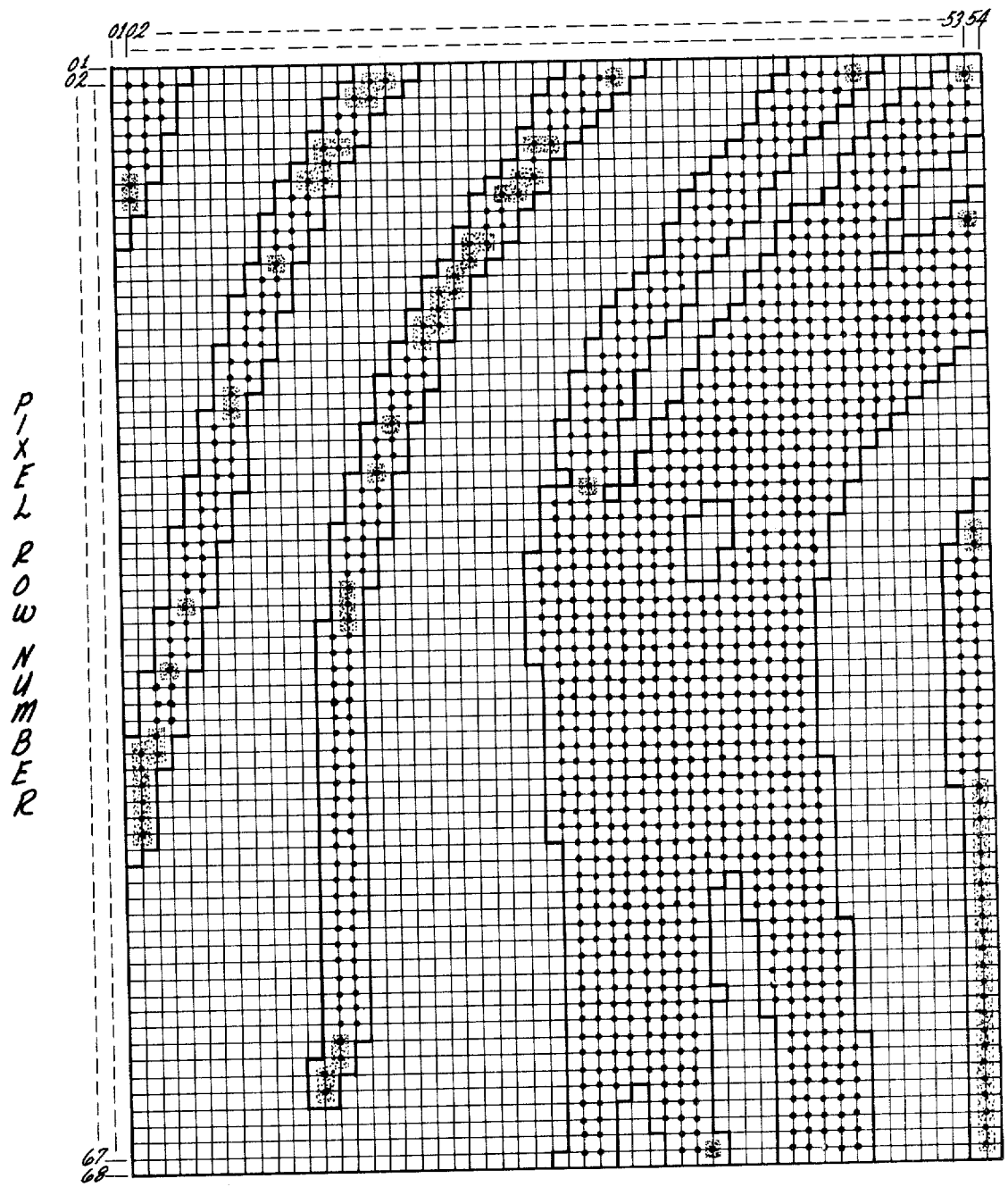
Fig. 14 FIRST ODD LEVEL (LEVEL ONE)

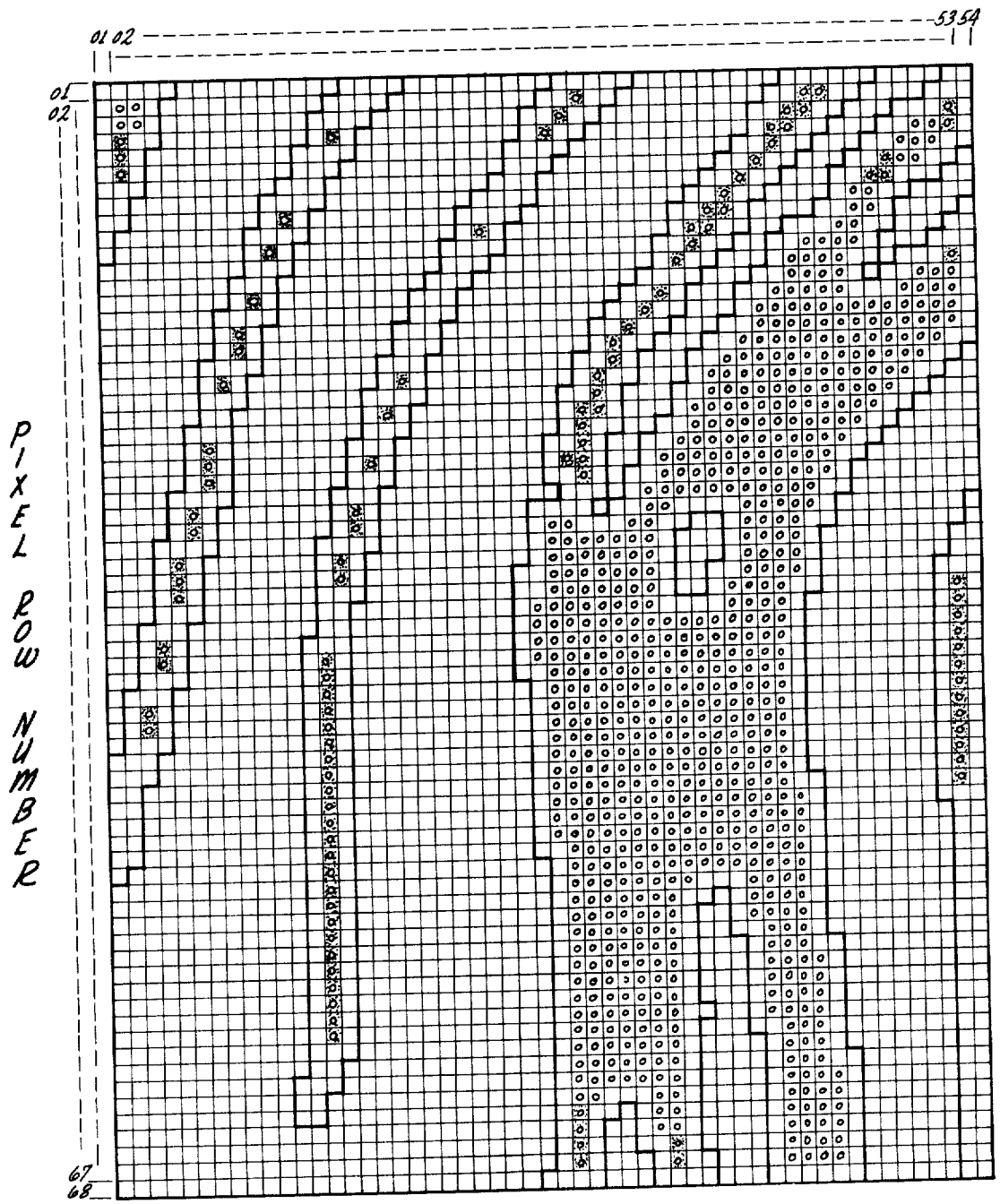
Fig. 15     LEVEL 2

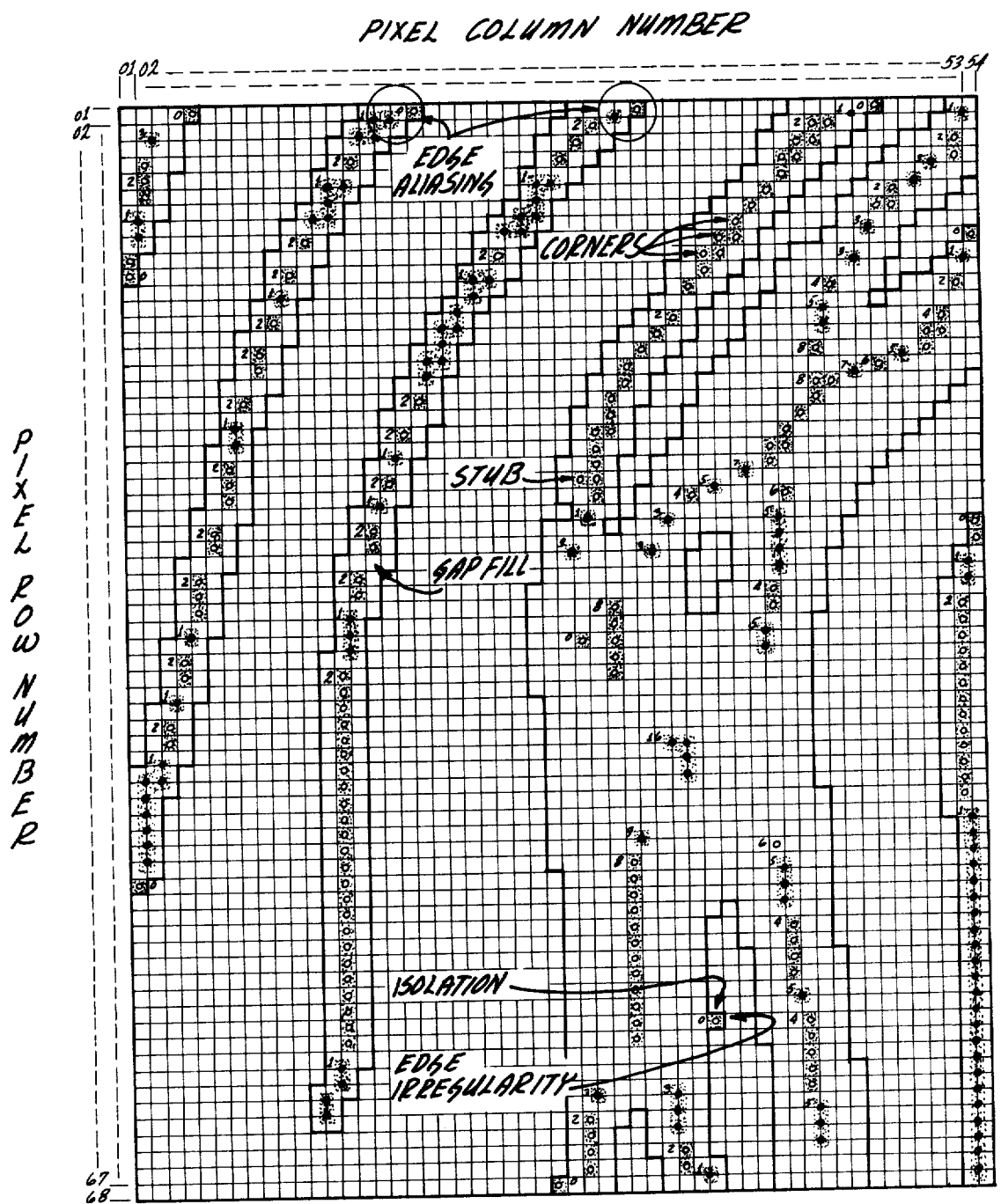
FIG. 16 FINAL COMPOSITE OF ODD/EVEN LEVELS

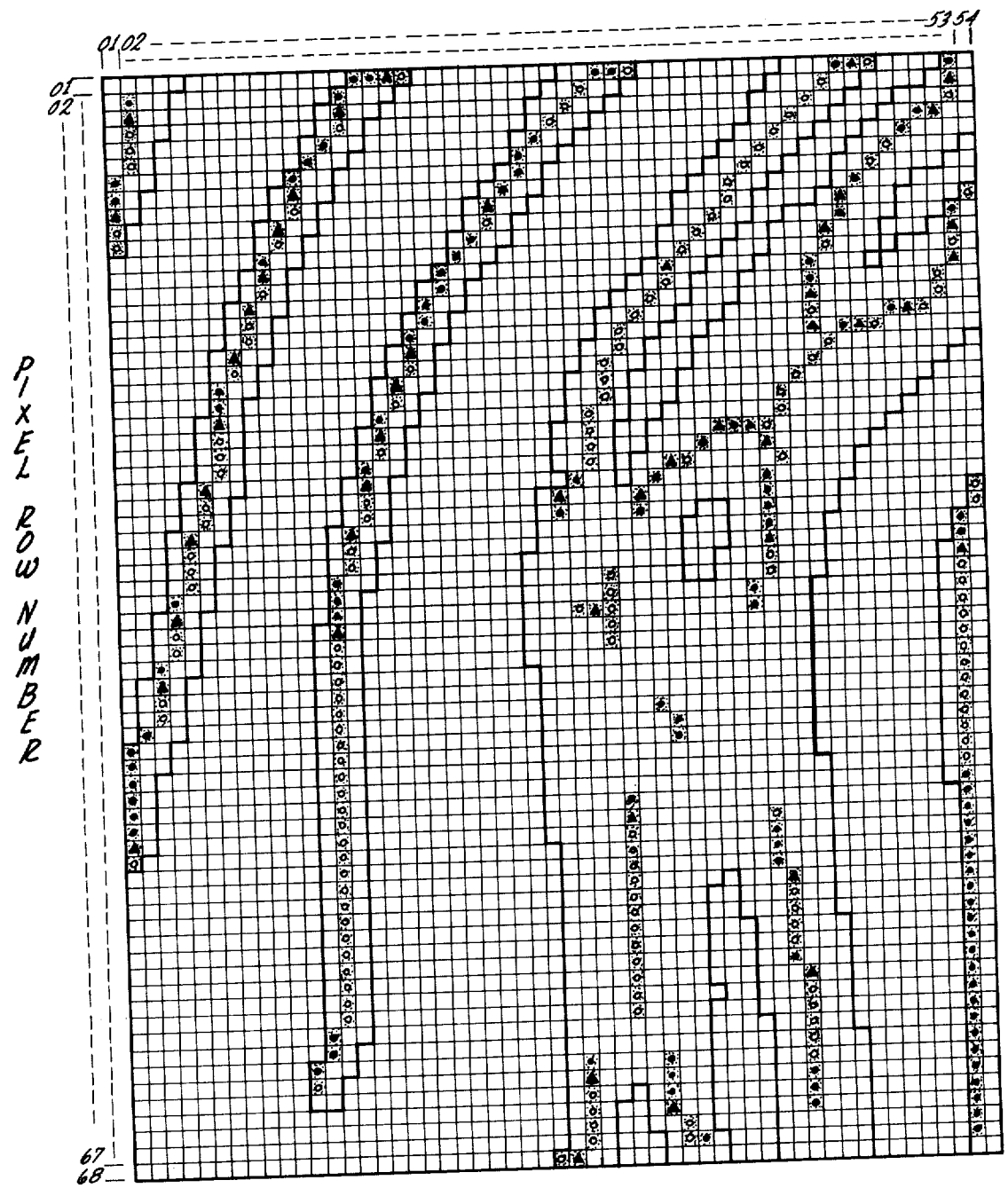
Fig. 17 CLEANED UP DATA

LINE FOLLOWER

This is a continuation of application Ser. No. 056,246, filed July 10, 1979, and now abandoned.

The present application relates to a system which provides for recognition of lines on a graphic document and follows those lines so as to generate a series of coordinates depicting the geometry or path representative of the line.

Line following may be generally defined as a process where a line, such as that found in documents as drawings, sketches, pictures, etc., is given a mathematical definition in the form of a series of X and Y coordinates. These coordinates generally consist of a start point and a series of further points depicting the meandering direction of a line and with the coordinates then further defining an end point. A multiplicity of the lines, which are depicted as described above, define the graphic document in a form that is readily manageable by computer processes for modifying the document's contents and for reproducing it electronically. This reproduction may be done on any type of known device such as either electronically by a CRT display, or mechanically by X-Y plotters and with the reproduction accomplished in an automated manner.

In general, with the system of the present invention, several accompanying attributes are assigned to the series of coordinates defining each line so as to fully complete the digital representation of the line on the document. In particular, analog features such as line thickness, color and feature representations are some of the attributes that may be used to finalize the picture content of the document. The picture representations may be symbols for buildings, roadways, etc.

Most of the documents which are to be processed for their line content would be physical in nature. However, the line following itself does not have to be a physical process. It is generally more convenient to use a camera system to produce an electronic image of the particular document and to subsequently process the resulting signal either directly or indirectly. For example, the signal may be processed indirectly if it is more convenient to temporarily store the signal on some sort of mass storage device, such as discs, magnetic tapes, etc. When the signals are stored indirectly on these mass storage devices, the signals can then be recalled at any time for subsequent processing.

In the present invention, the particular apparatus is described with reference to the application of this apparatus for line vectorizing a contour manuscript. However, it is to be appreciated that the potential of the present invention and its capabilities extend beyond the specific embodiment used to describe the features of the invention. For example, the design of the system of the present invention may be used to provide for a variety of input signals other than a contour manuscript. Other examples may be the line vectorizing of an image such as a finger print, an electrical or mechanical design drawing, a map, a sketch, etc.

In general, the purpose of any line follower system is to accurately depict the coordinates of all the lines that are contained in some sort of an image of the document. Depending on the resolution and accuracy to which the coordinates of the lines are to be defined, the entire document may be treated as one input to the processing hardware or the image on the document may be segmented into smaller subsets. This segmenting may be either done electronically or mechanically and each subset may then be processed independently, but later merged so as to represent at a later time the entire document. Although the resolution of the coordinates and the segmenting of an image is in general not pertinent to a line following process, the partitioning of the input data on this basis does help to solve some of the problems which have hindered prior art line following systems from providing for a successful automatic conversion of the lines on the document into the line vectors.

In order to provide for analysis of the line information in analog or picture form, the analog picture is usually converted to a series of sufficient digital descriptors which digital descriptors are sufficient to permit the restructuring and analysis of the analog picture. For example, a thick line going diagonally across a page could be completely described with X, Y coordinates, referencing the start and end of the line, with respect to some reference axes and origin on the paper and also with a descriptor representing a thickness of dimension.

From this analysis it would be obvious that to provide for such digital descriptors, the center of the line is one of the key attributes. Specifically, if a picture composed of a series of lines of varying thickness were to be reduced to its key elements, those key elements would be a series of points on the line centers. In the prior art terms "skeletonizing" and "line thinning" have been used to describe numerous techniques for reducing the lines to their key elements.

For example, in the prior art the analog picture may be first digitized to a binary image of zeros and ones on a two-dimensional array and then stored in some form of memory. A series of operations are then performed on each of the picture elements to determine whether each element should continue to participate in the picture under its present assignment or whether each element should be modified. The modification is usually one of elimination of those picture elements that are not key elements. In the prior art several logical and arithmetic operators have been devised to more or less achieve the desired results, but many short comings and anomalies characterize these prior art systems.

With the present invention which will be later described in detail, the invention is unique both in its form and as to the results that are produced. Generally, in the present invention, a two-dimensional binary image of ones and zeros is created by a process called pixelization. However, any process which ultimately produces a binary image in an addressable storage device is adequate for the data reduction method of the present invention. This addressable storage device may be either time addressable or location addressable, such as serial or random access memories. In the present invention the term "pixel" is used to define a finite area of a line or picture document that has been binary digitized for a one or zero to represent a light or dark condition. The total picture is then made up of an array of pixels, called the parent array and with the parent array so arranged that their storage address can be related to an X-Y coordinate.

With the present invention, lines with different thickness in this parent array consist of groupings of adjacent pixels that define areas of lightness or darkness. The areas so defined by these populations are therefore candidates for analysis so as to produce coordinates that define the line content of the image.

In general, the present invention provides for a solution to the problem of line following through a method consisting of a number of steps.

The first step is the creation of the parent pixel array which is generally referred to as data formation.

The second step consists of data analysis for picture integrity and reduction of noise. This is generally referred to as data preprocessing.

The third step provides for a reduction of the parent pixel array to its key, or center of gravity, elements called the key pixel array. This is referred to as data reduction.

In the fourth step, a data analysis of the key pixel array is used to create a set of linked contiguous center of gravity pixels, and a tagging of those key pixels that are unique picture entities such as line-end points, branch-points, etc. and a masking of the array perimeter to eliminate edge aliasing of lines that either leave or enter the array window due to an analysis of a small subset of some larger picture. This is referred to as data post-processing.

In a fifth step, there is an analyzing and clearing of the pixel memory by starting at each and every end point or branch point and generating a coordinate for each adjacent key pixel until another end point or branch point is encountered. This is referred to as line vectorizing or line following. The pixel memory will eventually be cleared if a line vector search starts and ends on those end points or branch points that had been tagged in the previous step. The picture elements that are closed figures, such as the letter "o", will remain in memory but will be handled as a special case.

In a last step, there is a repetition of all of the previous steps so as to provide for processing large pictures. Each data base of line vectors that are generated by the series of steps may now be related to its neighboring data bases and the entire picture can then be reconstructed from the individual patches of the document which have been generated and stored.

The present invention, therefore, provides for a system and method of line vectorizing generally described by the steps referred to above and the particular apparatus that provides for the data analysis which is part of the individual steps.

A clearer understanding of the invention will be had with reference to the following description and drawings wherein FIG. 1 illustrates a general system configuration for line vectorizing an input image;

FIG. 11a illustrates the signal created when the input signal is relatively noisy so as to provide for holes or spots or highly irregular edges;

FIG. 11b illustrates two cases for noise reduction;

FIG. 12 shows a portion of an analog document to be line vectorized;

FIG. 13 shows the pixelized image of this document on a 54×68 array for simplicity of drawing;

FIG. 14 illustrates the results of the first odd level of processing;

FIG. 15 illustrates the next even level of processing;

FIG. 16 illustrates the results of continuing the processing until no more 2×2 clusters exist;

FIG. 17 illustrates the results of a clean-up phase to either eliminate unwanted pixels or fill in necessary pixels for the line following;

FIG. 18 illustrates 9 cases for which a one bit RAM must be coded so as to provide for the end point detection;

Before discussing the particular method and structure of the present invention used to provide for the various steps to accomplish the invention, two general concepts of array processing will be explained for greater clarity. These two concepts of array processing are a 3×3 array processing for data anayIsis and a 2×2 array processing for data reduction. The use of the 2×2 array processing for data reduction is one of the important aspects of the present invention.

Figure 3A:
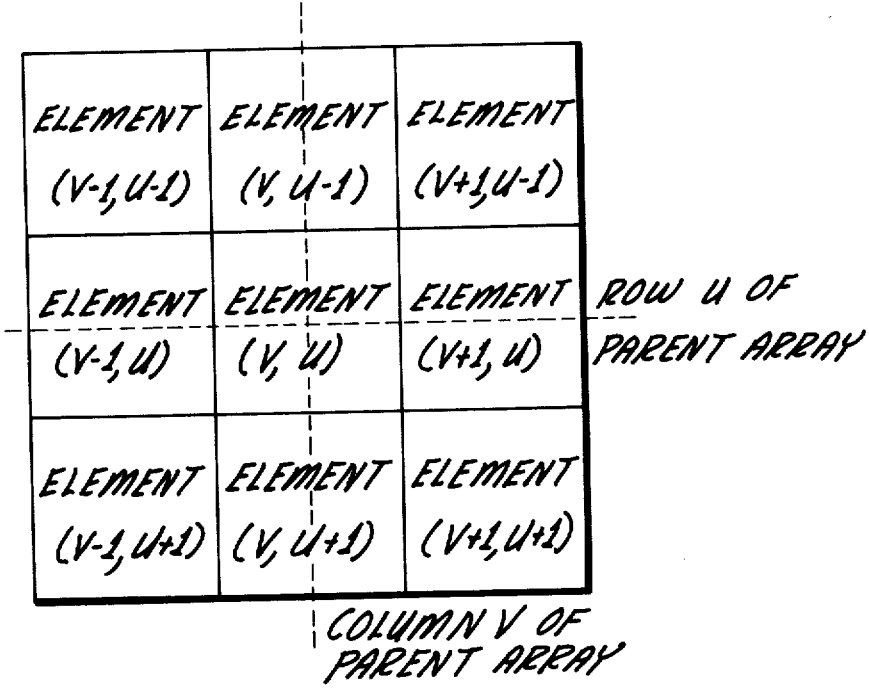
FIG. 3a illustrates a 3×3 spacial arrangement of pixels.

FIG. 3a illustrates a 3×3 spacial arrangement of pixels. As can be seen with reference to FIG. 3a, the domain of each pixel represents a portion of the picture that has been assigned either a light or dark state. For data analysis the state of each 3×3 array in the parent array are effectively assessed simultaneously. In other words, the different data points in a 3×3 array are assessed simultaneously. This may be accomplished by sequence addressing of data from a random access memory or by shift registered techniques where each pixel on each shift pulse participates in a new 3×3 array. This latter approach is most efficient because the analysis of data for a variety of outcomes can result by serially cascading several logical networks so that the results of one shift register network can be passed on to the next network which is operational simultaneously on data from adjacent arrays. The only requirement in cascading serial processors is that the state of a pixel be altered only after it has participated in an all intended 3×3 (or 2×2) array subsets.

Figure 1:
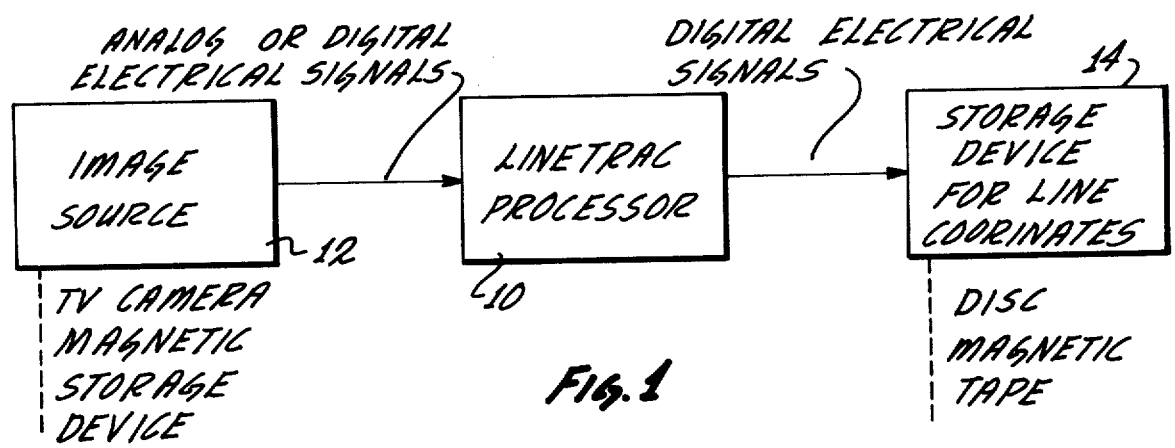
Figure 3B:
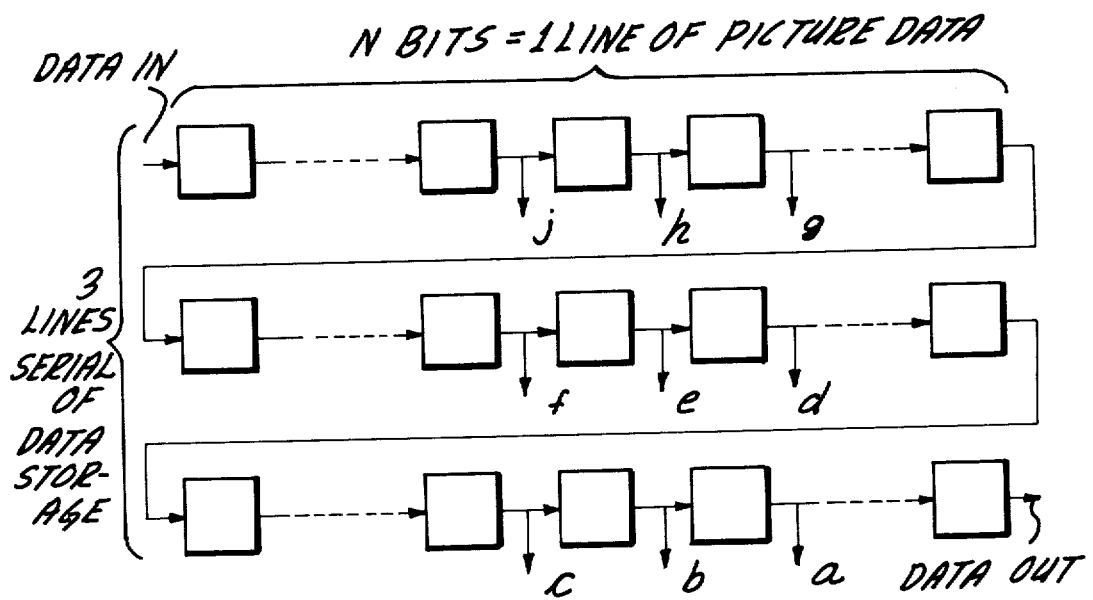
FIG. 3b illustrates a 3×3 pixel array accessed serially in a serial processor.
Figure 3C:
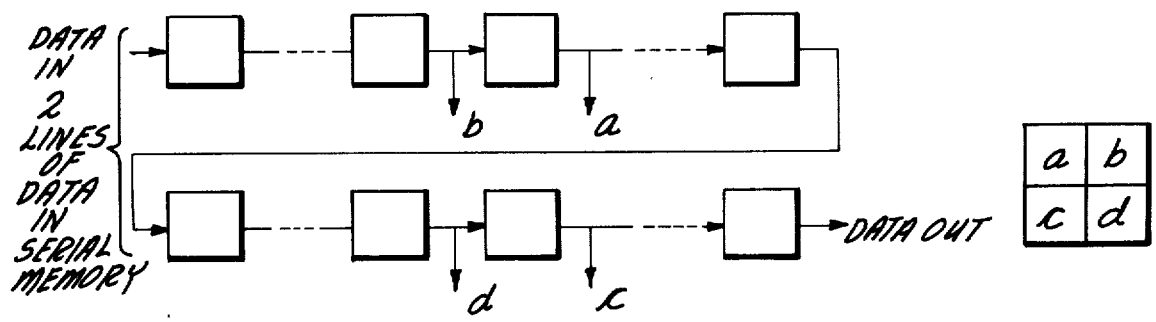
FIG. 3c illustrates a 2×2 pixel array accessed serially in a serial processor.

With the shift register approach in the data analysis of a pixel array, this can be accomplished by buffering each processing network with sufficient bits of delay storage thereby isolating the array images passed on to the next processor. This isolation is very important to the 2×2 array processing for line thinning. FIGS. 3b and 3c illustrate the serial processors which respectively access 3×3 and 2×2 fixed arrays. Generally these serial processors are part of the entire processor of the present invention shown as the Linetrac processor 10 of FIG. 1. In the present invention, the entire processor will be referred to as a Linetrac processor when describing the processor as a total unit. As shown in FIG. 1, the input to the Linetrac processor 10 may be from an image source 12 and this image source may be either directly from a scanning device such as a TV camera or may be from information which has been stored such as on a magnetic storage device. The output signals from the image source 12 may be either analog or digital signals, but the outputs from the Linetrac processor 10 are digital electric signals and are applied to a storage device 14 for various line coordinates. This storage device may be of any appropriate type such as a disc or magnetic tape storage device.

Figure 2:
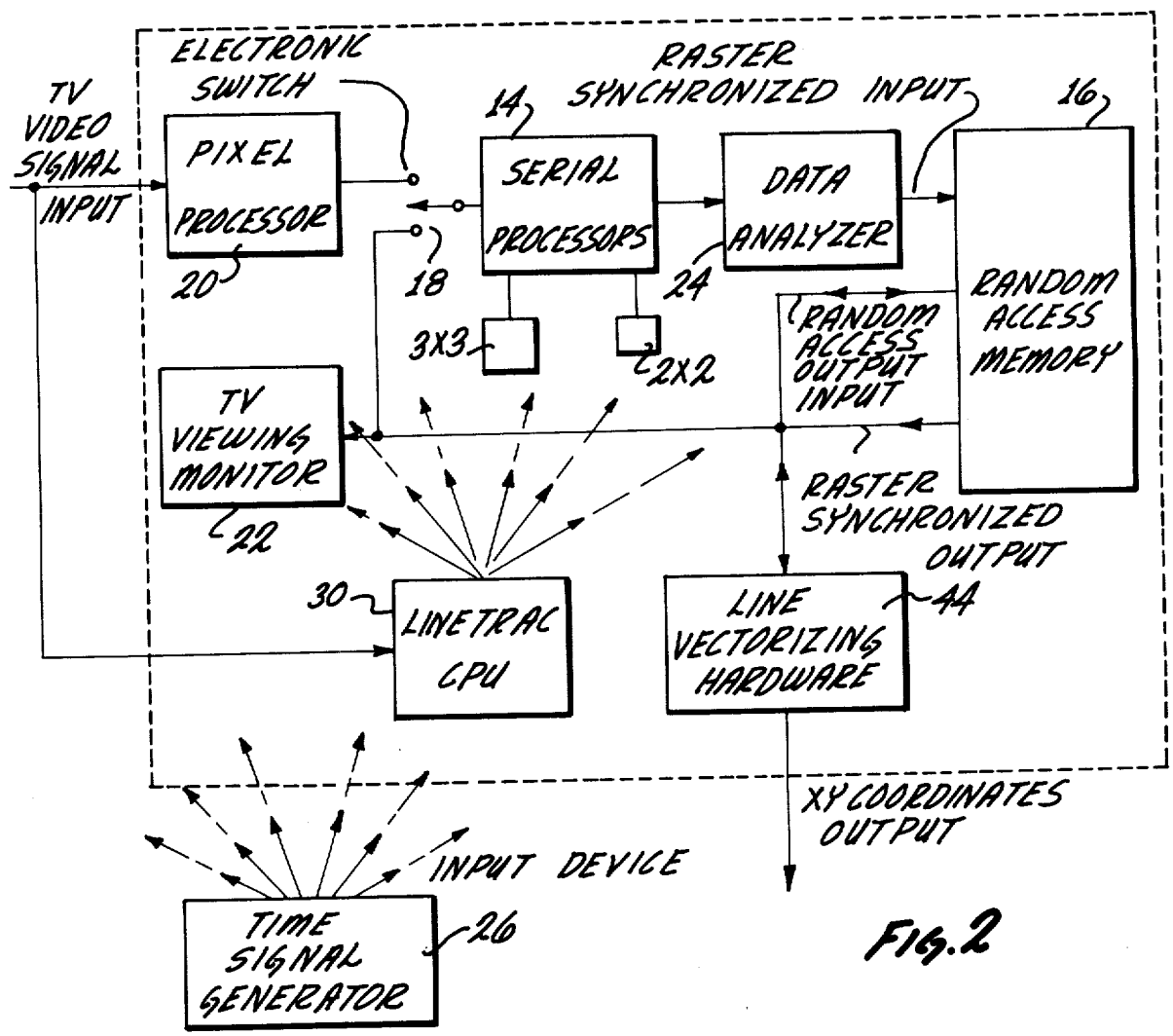
FIG. 2 is a detailed block diagram of a system of the present invention and showing as the input to the block diagram a Raster TV Scan.

As shown in FIG. 2, the block diagram typically receives the input data from a serial device which is shown in FIG. 2 as a TV camera. However, it is to be appreciated that the input data may be from storage such as a magnetic storage device. Generally the organization of such input data typifies a Raster Scan pattern and as such the data can be serially processed in the manner described above while it is being input into the Linetrac processor. This is shown by the serial processors 14 of FIG. 2. As shown in FIG. 2 the serial processors 14 include both the 3×3 and 2×2 serial processors respectively illustrated in FIGS. 3b and 3c. If on the other hand the Raster input format for the input data is not available or convenient, then a random access memory corresponding to the random access memory 16 of FIG. 2 can be randomly filled with the data which can then be serially addressed for the serial processors 14 of FIG. 2. Of course, when the random access memory 16 is used, means may be included for converting the information in the memory into a logical form such as occurs in a raster scan since the successive points in the raster occur on a progressive time basis. This is shown by the Raster synchronized input and output of the RAM 16 of FIG. 2.

Because the data processing of the Linetrac processor is a reiterative process, an electronic switch 18 in front of the serial processors permits data to first pass from an external source through a pixel processor 20. The information is then processed by the serial processors 14 and the data analyzer 24. The processing by the data analyzer 24 is in a 3×3 array or a 2×2 array in accordance with the controls which are shown as "3×3" or "2×2" and which are shown as being attached to the processors 14. Such processed data is then introduced to the random access memory 16. The information stored in the random access memory 16 may be rearranged and viewed on a logical basis, such as in a raster scan, on a conventional TV monitor 22 by tying this monitor into the data loop as shown in FIG. 2.

The processed data from the random access memory 16 may then be introduced to the serial processors 14 for further processing by the processors 14 and the data analyzer 24. Such further processing occurs by the connection of the movable contact of the switch 18 to the lower stationary contact in FIG. 2. Such further processing occurs on the basis of a 3×3 array or a 2×2 array in accordance with the controls provided on the serial processors 14 by the boxes designated as "3×3" or "2×2". The further processing of the arrays provided by the serial processors 14 is produced by the data analyzer 24. Such further processed information from the data analyzer 24 may then be introduced to the random access memory 16.

In this way, the processing of information may occur through a plurality of cycles. In each cycle, the information processed is that provided in an array by the serial processors 14 and analyzed by the data analyzer 16 in the previous cycle and introduced, after analysis, to the random access memory 16.

Figure 4:
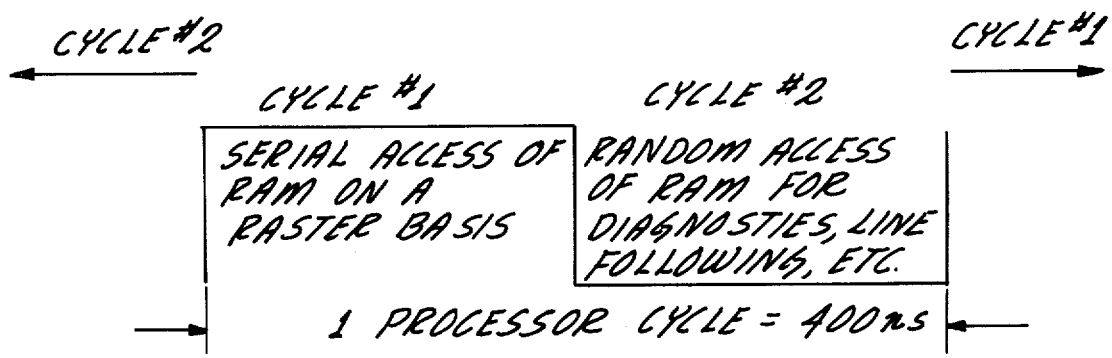
FIG. 4 illustrates a processor cycling to provide a sharing of the use of the main pixel RAM.

The design of the apparatus of FIG. 2 is such that the pixel RAM 16 is time shared between two operational cycles. Cycle 1 uses the RAM 16 for the read/write requirements of serial processing and TV monitor viewing. Cycle 2 uses the RAM 16 for the random access of data for the actual line following process which involves read and writes to the RAM to track a line one pixel at a time. This cycling is shown in FIG. 4, which illustrates the interleaved use of memory. Because of the cycling, both types of processing can effectively occur concurrently, thereby allowing simultaneous Raster to vector, vector to Raster transformation. This means that anything deposited randomly in Cycle 2 will be read serially in Cycle 1, thereby realizing the vector to Raster transformation and anything deposited serially in Cycle 1 can be read randomly in Cycle 2 thereby realizing the Raster to vector transformation.

Aside from the sharing of random access memory for viewing and the above format conversion, the 3×3 and 2×2 array processing by the serial processor 14 and the data analyzer 24 occurs primarily in Cycle 1. A number of these processors may be cascaded, one feeding the next in a serial fashion. Th first processor receives this data from the RAM 16 or the pixel processor 20 and the last of the cascaded processors writes its data into the RAM. Each time the Linetrac apparatus is primed with new data, the pixel processor 20 is injecting data into the loop through electronic switch 18 for one frame scan of the input device. As a particular example of a time base and camera system which may be used in the Linetrac apparatus, this frame scan or "snapshot" takes 20 milliseconds, after which the movable contact of the switch 18 reverses back to contact the lower stationary contact so that the RAM 16 supplies data to the serial processors 14. The output from the serial processors is coupled through data analysers 24 to the RAM 16. While the serial processors 14 and data analysers 24 are continuously modifying the data base through the cascaded serial processors, the TV monitor 22 operating in Cycle 1 shown in FIG. 4 continuously displays the data base from the previous processing.

Figure 5:
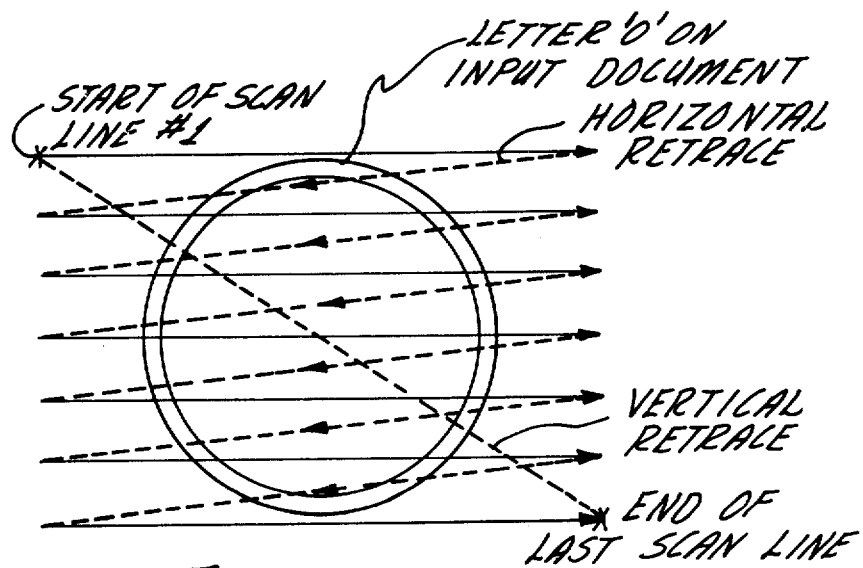
FIG. 5 illustrates a Raster type scanning pattern.
Figure 6:
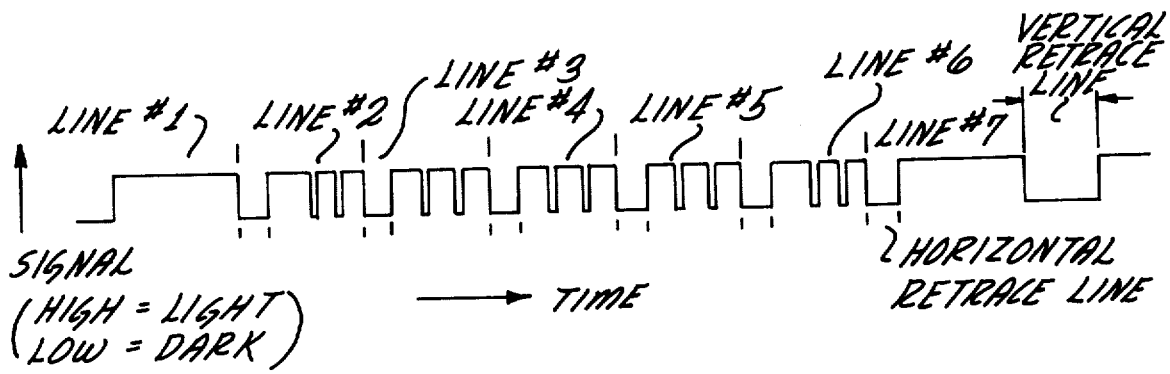
FIG. 6 illustrates a typical video signal produced from a serial device such as a TV camera having a scan pattern such as shown in FIG. 5.

A particular Raster type scanning pattern is shown in FIG. 5. With the exception of interlacing, this type of scan pattern is typical of what one sees on a commercial television. The number of scan lines and the times assigned to retracing the scannings are not critical to the line following techniques of the present invention. A timing signal generator 26 as shown in FIG. 2 generates those signals necessary to keep the input device and the various processing hardware synchronized and formatted in conventional fashion. FIG. 6 illustrates the type of video signal that would come from such a serial device as a TV camera with the scan pattern in FIG. 5 sensing the input image pattern of the letter "O".

The binary signal shown in FIG. 6 typifies the signal levels of a line document consisting of a white background and black lines. However, most TV cameras produce an analog signal which is capable of characterizing varying gray levels. To interface this type of analog signal to the digital format of the pixel processor 20 and the subsequent hardware, a threshold comparator may be incorporated in the pixel processor 20 so as to define that voltage level above which all levels represent white and below which all levels represent black. A particular comparator 28 is shown in FIG. 7 and is conventional in nature and includes a variable potentiometer so as to adjust the voltage level representative of either white or black.

Figure 7:
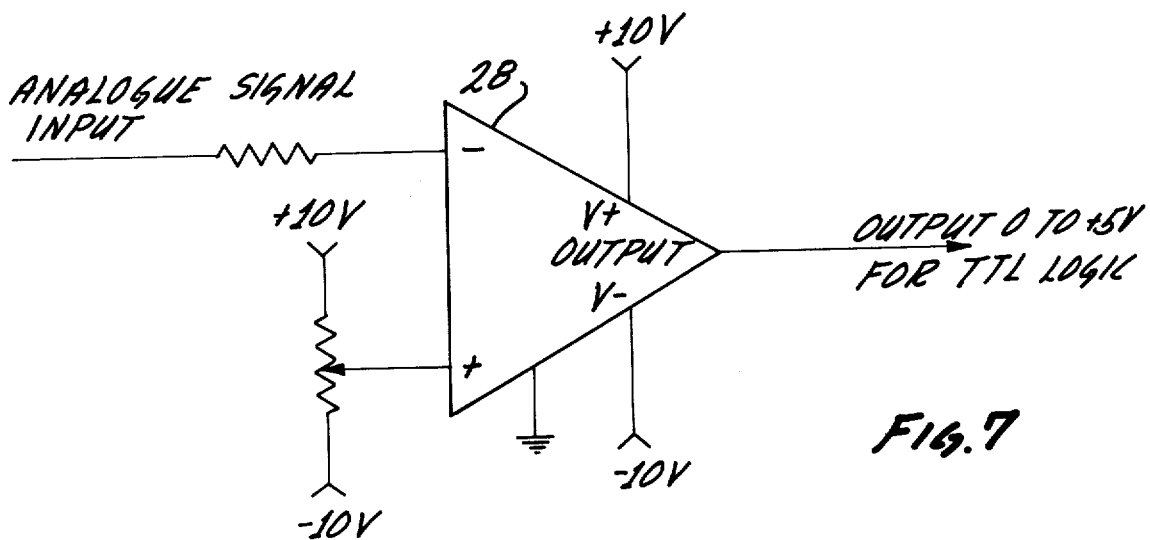
FIG. 7 illustrates an adjustable threshold comparator to establish a voltage level for black or white input signals.
Figure 8:
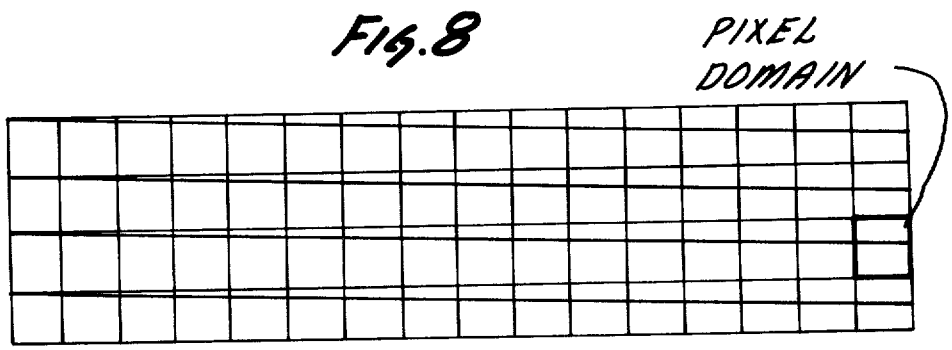
FIG. 8 illustrates a 4×16 pixel array relative to a Raster scan geometry.

The input signal which has been thresholded by the comparator 28 shown in FIG. 7 is further processed by the pixel processor 20. Specifically FIG. 8 illustrates the partition into pixels of an area being scanned or represented by the serialized electronic signal. The particular geometry of the TV camera such as the optical magnification, deflection angles, etc, or the particular assignment of distance to time for the input signal, ultimately determines the physical size of each pixel. In FIG. 8, each rectangle represents an individual pixel. The skewed lines in FIG. 8 represent raster scan lines. As can be seen in FIG. 8, an individual pixel's domain can include portions of several lines of input data.

In a particular example of the invention, a 256×192 pixel array was implemented for a system geometry that had one line of serial data representing 51.2 microseconds scanning time, or 10.24 millimeters of an input document. The particular system had 384 scan lines in the vertical direction. Each pixel, therefore, used portions of two input lines. This dimensional assignment is arbitrary and would be made in conjunction with the required resolution and processing speed. With the particular numbers referred to above, one pixel domain was 37.5 microns by 37.5 microns. Generally considering the various hardware features described above and the various definitions which are now a portion of this application, the sequence of the steps to accomplish the practice of the invention will be explained in more detail.

In the first step of data formation, the purpose of the pixel processor 20 is to take samples of the input signal from each line that falls in each pixel domain, such as the individual domain shown in FIG. 8. The number of samples taken for each pixel is then examined and a decision made to assign a one or zero state to the entire pixel based on the population of ones or zeros of the sampled set. In a particular system, eight samples were taken in a pixel, four from each of the two lines in a pixel's domain, and five or more digital ones out of the eight samples in the pixel resulted in an assignment of a digital one for the entire pixel. Otherwise, a digital zero was assigned as the state of that pixel.

It is to be appreciated that the number of samples and the decision threshold are arbitrary and may be selected to match the type of information being scanned. For example, the signals from a fingerprint are generally much more noisy than those from a scribed line document and the parameters would be selected to produce the best results for each.

Figure 9:
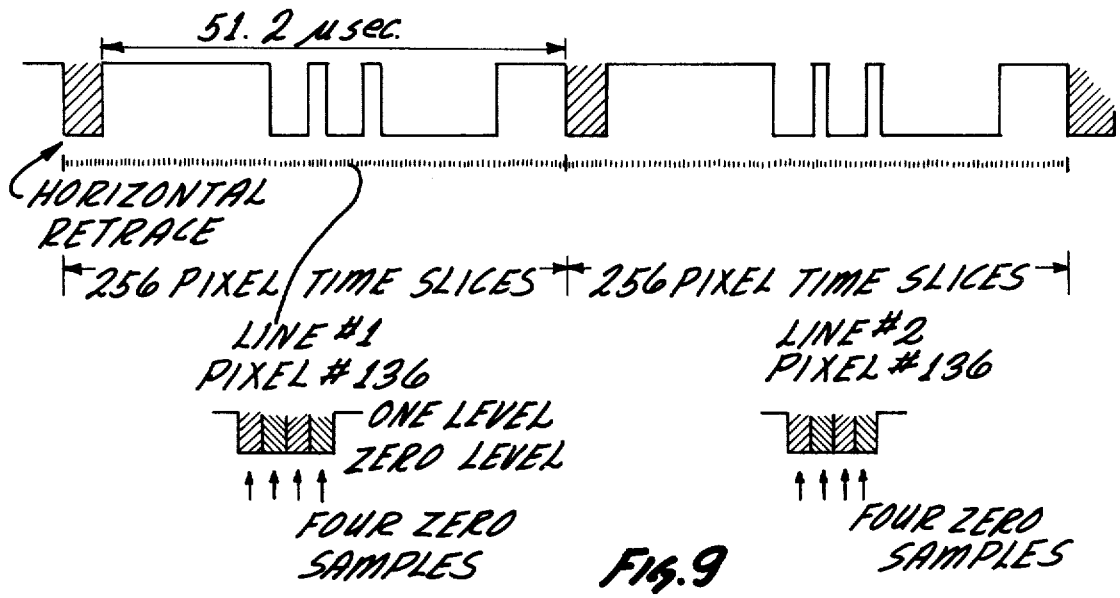
FIG. 9 illustrates an expanded view of the signal input wave form of FIG. 6 for the purpose of illustrating the sampling for a pixel.

All the particular parameters for the Linetrac processor can be selected at the time of running because the hardware has been designed to assume parameters that are set from a control memory, such as the Linetrac CPU 30 of FIG. 2. FIG. 9 shows a greatly expanded view of the signal input wave form of FIG. 6 for a particular example and is for the purpose of illustrating the sampling for a pixel.

For a particular Linetrac configuration as shown in FIG. 9, each line is divided into 256 time or pixel slices. In each of these time slices, four samples are taken and a running total of ones and zeros retained for the next line of each pixel. After the second line has been sampled, the accumulated value is thresholded to determine whether the value of the pixel is to be considered as a digital one or a digital zero, and the one or zero results for each pixel are saved in the pixel RAM 16 and the accumulated values are cleared for a processing of the information in the next row of pixels.

Figure 10:
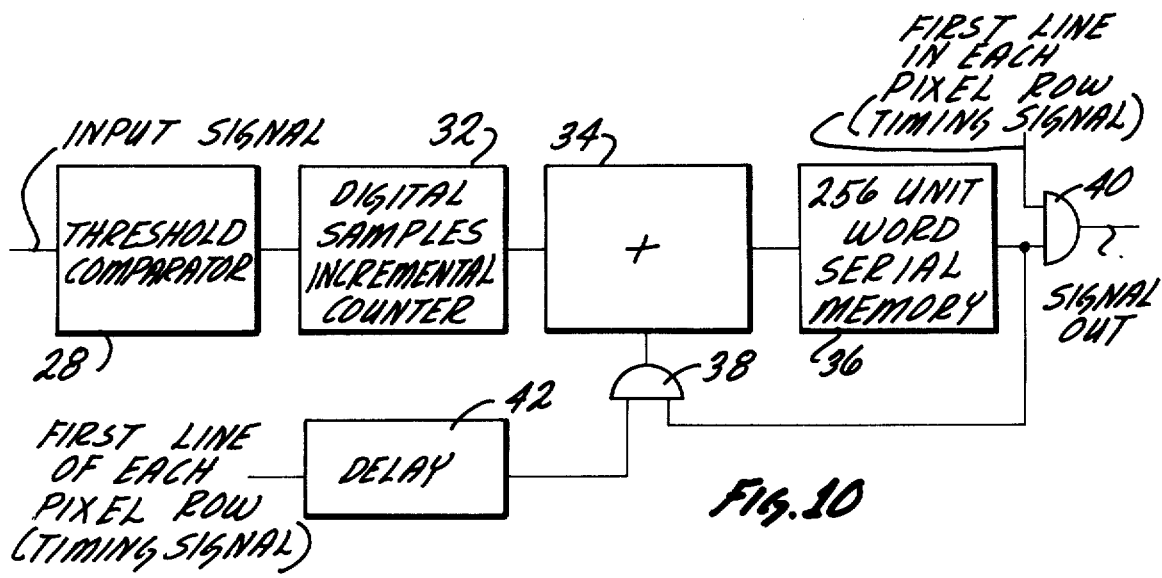
FIG. 10 is a block diagram of a pixel processor.

The resulting data for each pixel is conveniently stored in the RAM 16 whose addressing scheme is such that an X and Y address in memory corresponds to a physical arrangement similar to but greater than that shown in FIG. 8. For a 256×192 pixel array, 49,152 words of the RAM 16 are used with a sixteen bit address. Eight bits of the address define a pixel's horizontal position, while the remaining eight locate it vertically The sixteen bits of addressing are, for Cycle 1, synchronized to the scanning pattern via binary counters that increment and then reset with each retrace, thereby effectively filling the pixel memory row by row. Only Cycle 1 sees the address lines of the RAM 16 controlled this way. Cycle 2 can control the address lines differently for the purpose of analyzing the data in a random fashion. It can be seen in FIG. 9 that multiple lines can participate in the ultimate state of each pixel. The pixel processor 20 has sufficient storage to accumulate the pixel totals after which information is then transferred out and the pixel processor initialized for the next row of pixels. FIG. 10 depicts the pixel processor 20 and illustrates its functions.

The input signal in FIG. 10 passes through the threshold comparator 28 described in FIG. 7 and is passed to a digital sampler 32. The digital sampling for each line of a pixel is accomplished by incrementing a counter 32 once if the input signal is a digital one at the occurence of the sampling signal. A 256×4 bit serial memory 36 is shifted in synchronism with the input signal and up to four samples are added to memory for each line. A four bit word is sufficient to store four samples for up to four lines for each pixel. The logical AND gates 38 and 40 in FIG. 10 act as switches to initialize accumulated values to zero at the start of each pixel row and to route data out of the pixel processor. The delay 42 provides for a delay so that the and gate 38 may properly act as a switch.

Figure 11:
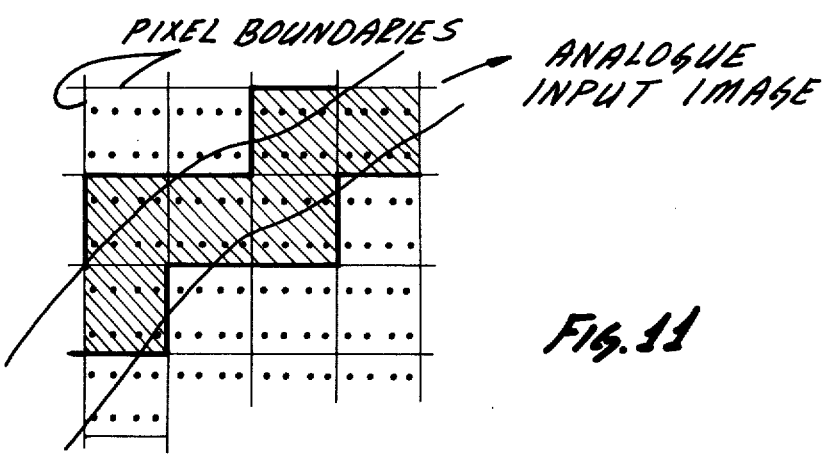
FIG. 11 illustrates a portion of a pixel image created from a sampling of an input data stream.

The pixel processor 20 shown in FIG. 10 digitizes the picture that is buried in the serial input waveform and, once the digits are in the RAM 16, the picture can be electronically viewed with much greater ease. One of the prime functions of the pixel processor 20 is to structure the data base into an organized array of pixels. The number of samples and lines in each pixel while providing data compaction provides noise immunity and eliminates holes or spots in the picture that is being digitally reconstructed in the RAM 16. By sampling a set number of times, a threshold can be selected to eliminate noise. Each pixel is a coarser digital representation of the sample and a data reduction has taken place with the pixel elements as representatives of the input picture. FIG. 11 illustrates a portion of a pixel image. The dots represent the sample positions and for a threshold of three on the eight samples, the shaded portion shows the pixels that become the digital image of the input line. It can be seen that this produces the characteristic digital squaring of the edges. The quantizing effects can always be minimized by an appropriate selection of memory size and sampling interval.

In FIG. 2 it is illustrated that the output data of the pixel processor 20 may be coupled to the RAM 16 through other networks. The first of these other networks, the serial processors 14, is arranged to receive data from the pixel processor 20 or the RAM 16 itself. This is accomplished by the switch 18. This switching arrangement permits an input data stream to be recycled for another level of data reduction and storage and recycled as often as necessary to reduce in number the initial snapshot of pixels, which for example can represent one scan pattern of 384 lines. In the accordance with its state of operation, the switch 18 can effect data recall from the RAM 16 or the pixel processor 20. The serial processors 14 operate in a similar manner whether they are processing the initial data stream or some subsequent intermediate results that have been temporarily stored in the random access memory.

By nature of the serial input format, after four lines of data have been received and pixelized, two rows of pixels are now available to the serial processor 14 for continuing analysis. One of the major aspects of the present invention is the process of data reduction and compaction. It has already been described that the process of line following need be only concerned with the center of gravities (centroids) of the lines themselves. In the pixelizing process, a thick line will produce a large contiguous population of active pixels. These active pixels will either be a one state or zero state depending on a positive or negative logic assignment to the light or dark states. The serial processors 14 analyze groups of 2×2 pixels with the objective of eliminating all non-key (non-centroid) pixels. For example, when the serial processors 14 and the data analyzer 24 analyze a 2×2 array of pixels, a digital one will be produced when all four of the pixels in the array are a digital one.

The second step in the general process of the present invention is referred to a Data Preprocessing. Sometimes the input signal is relatively noisy so as to result in holes or spots or highly irregular edges in the pixel array. These three phenomena are shown separately in FIG. 11a. The pixel processors 14 and the data analyzer 24 will have provided some noise rejection, but still the quality of the input document being scanned contributes significantly to the noise level.

As an example, a pencil document is a good example of an input document that has all three types of noise shown in FIG. 11a. If a pencil line is looked at under magnification it can be seen how the pencil lead has spotted the surface to which it is applied. Since it is known as a basis for the system that the data base consists of lines of dimensions considerably larger than the pixel element itself, all three types of noise shown in FIG. 11a can be sensed and eliminated to clean up the picture before seeking the line centers.

Specifically, the data stream of the pixel processor 20 may be passed through the network such as shown in FIG. 3b and by logically viewing all 3×3 sub arrays as they pass by, holes and spots can be eliminated and the edges smoothed. The logic network that analyzes each of the 9 elements of FIG. 3b is a simple table look-up RAM with the 9 address bits being the 9 array elements. $2^9$ (512) arrangements of ones and zeros are possible in a 3×3 sub array. If a 512 bit by one bit RAM has been preloaded with a bit map of all cases categorizing a particular class of required action, then as those cases subsequently appear on the address lines, the RAM locations will come up true to initiate the required action.

For example, FIG. 11b outlines two cases where the look-up RAM has been programmed to clean up specific types of noise. A 3×3 window is adequate for the present invention, but should the need arise to view larger windows for noise, data analysis, etc., then the table look-up technique can be expanded to 4×4 or 5×5. The size of the available RAMs in today's market makes the expansion practical. However, with the present invention it has been determined that the 3×3 array is sufficient. In FIG. 11b, one case is an example where the look-up RAM provides for pixel addition to fill a hole. In other words, the "x" at the middle of the 3×3 array in the first example in FIG. 11b is removed, and an "x" is added in the middle of the 3×3 array in the second example in FIG. 11b. The look-up RAM would be part of the data analyzer 24 and it is to be appreciated that other schemes for providing for the analysis of data to improve the quality or reduce the noise may be used.

The third step of the overall system is defined as Data Reduction. The cleaned-up data from the data analyzer 24 as discussed in the previous paragraph, is now the subject of 2×2 array processing for the reduction of the parent pixel array to its key elements. If a sub array of 2×2 pixels is in the active state, then by replacing the four pixels by an intermediate assignment at the 2×2 centroid and erasing the original 2×2 participants only after any of its members can no longer participate in any other 2×2 combinations, and recursively applying this principle, eventually only the key elements survive and clusters of 2×2 no longer exist. All the redundant data may now be discarded which produces a major advantage in the system. In other words, if a sub-array of 2×2 pixels has all digital "ones", the sub-array is replaced by a digital "one" and the position of this digital "one" is noted for the next cycle of operation. However, this replacement is made only after the digital positions in the 2×2 array have been processed in all of the 2×2 sub-arrays of which they form a part.

Generally it would appear that additional storage would be required to store the offspring of a 2×2 cluster. This additional memory, however, is only required in a serial data path of the serial processors 14 and not outside of the serial processors and is not necessary in the RAM 16. The serial processors 14, and it is appreciated that there can be several of these that are cascaded, are structured so that they produce data an even number of times and hence each serial processor has pixel boundaries, again coincident with the original 256×192 pixel array. Should any internal 2×2 processing produce survivors at an odd level, then rather than carry an extra word storage to depict its new location, an extra bit can simply signify that a surviving pixel's true coordinates are its current position in memory adjusted by plus ½ a pixel dimension in X and Y.

The shifting of ½ a pixel dimension for each processing of a 2×2 sub-array may be seen from an analysis of centers of gravity. The center of gravity in each pixel in a 2×2 array occurs at the center of the pixel. However, the center of gravity of a 2×2 pixel array occurs at the position common to the four pixels in the array. This represents a shift of ½ a pixel in the center of gravity. Thus, two successive proceedings of data in a serial manner produces a shift of a whole value of a pixel in the center of gravity of the pixels in the 2×2 arrays.

In addition to shifting the center of gravity of the pixels in each cycle of data processing, the serial processors 14 and the data analyzer 24 record the number of times that the information is serially processed. This information is recorded in the serial processors 14 in each cycle. In this way, information is provided as to the number of pixels through which the center of gravity of the pixel array has been shifted. This will be described in detail subsequently.

Figure 19:
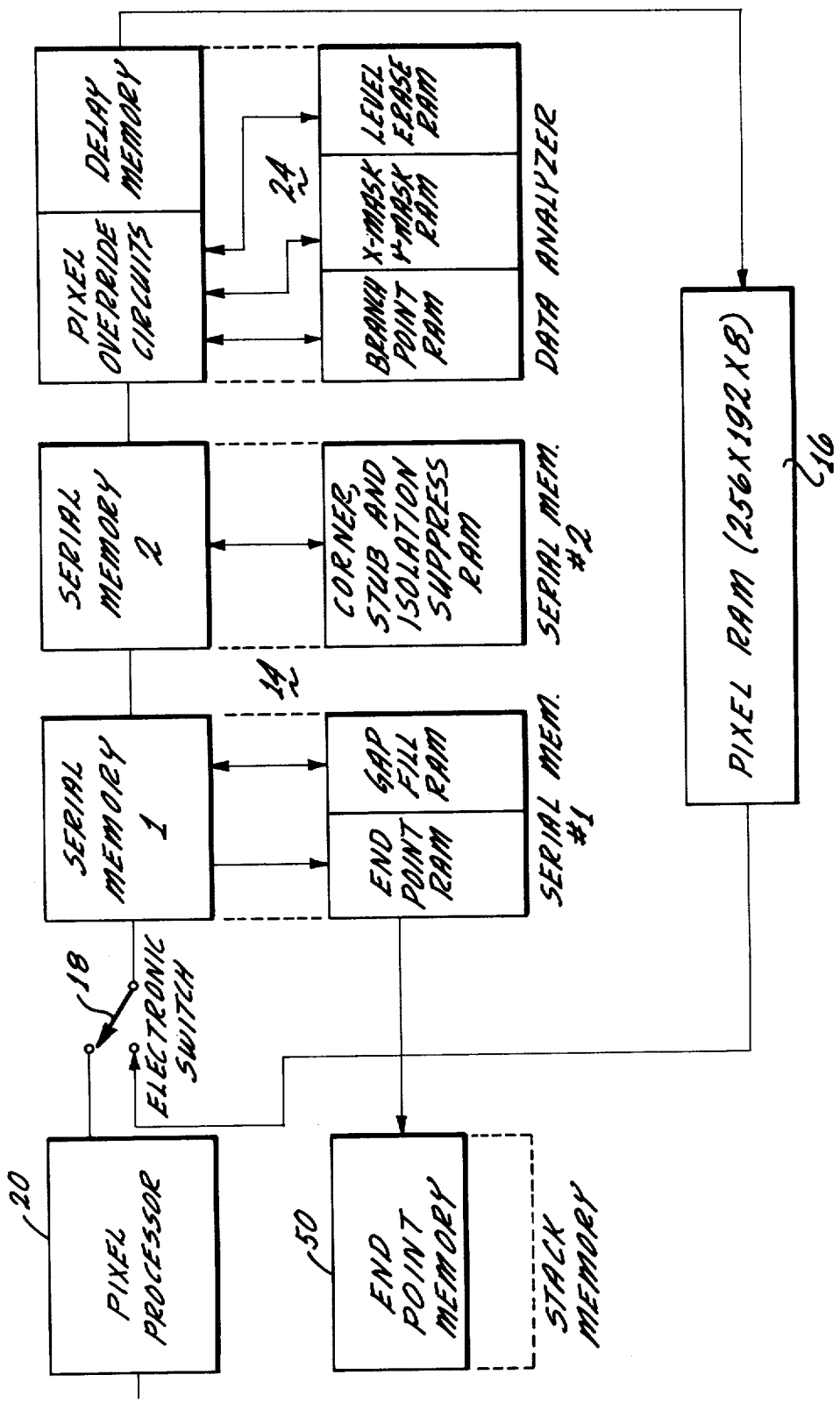
FIG. 19 illustrates an expanded portion of the block diagram of FIG. 2 to show in more detail the serial processors and data analyzers used to provide for the results illustrated in FIG. 17.

The serial 2×2 processing becomes clearer as shown in the pictorial illustrations of FIGS. 12 through 16. In addition, the block diagram of FIG. 19 shows two four level serial processors used to provide for the 2×2 serial processing.

FIG. 12 shows a portion of an analog document to be line vectorized. FIG. 13 shows the pixelized image which is on a 54×68 array for simplicity of drawing. In FIG. 13, the perimeter pixel boundaries of the line images have been emphasized to show squaring and each active pixel is designated with a circle at the pixel center. For simplicity and for understanding the pictorial 2×2 process of elimination, it can be assumed that the pixel memory has sufficient storage to accommodate intermediate offspring storage for the ½ pixel dimension displacement resulting from each cycle of data processing. Graphically, this storage is done simply by placing an offspring dot at the center of the 2×2 parent circles and then erasing any of the parents that can no longer participate in further 2×2 combinations. In FIGS. 13 through 16, the square grid background represents the pixel cell boundaries and, for the figures showing the odd level results in one cycle of data processing, graphical placement of dots is at the grid intersections (such as in FIG. 16) and, for the even level results (including the initial pixel array) resulting from two successive cycles of data processing, the circles are at the center of the squares. As already indicated, the extra storage in the single cycle of data processing is not required but its presence graphically and electronically is an aid to easier understanding.

Graphically, one can apply the 2×2 method in only the areas of pixel population since zero pixels result in zero processing. But electronically, the examination of memory and application of the 2×2 method would have to be systematically and exhaustively done by addressing the RAM 16 serially (in Raster fashion) line by line and shifting data into the serial processors. The offspring generated by a 2×2 cluster of parents can annihiliate the parents pixels two rows (4 lines) later when each of the parents will have participated in up to four possible 2×2 clusters of analysis.

The results of the first (odd) level of processing resulting from a single cycle of data processing are shown in FIG. 14. The next (even) level of processing resulting from two successive cycles of data processing yields FIG. 15. By continuing until no more 2×2 clusters exist and accumulating the surviving pixels, FIG. 16 results. The numbers beside some representative surviving pixels indicate the level (or number of successive cycles of data processing) at which a pixel achieves the status of no participation in a 2×2 cluster, which is when the surviving pixel can generate no offspring so that the family tree is terminated. For example, FIG. 7 illustrates that the concentration of arrays of 2×2 pixels occurs in some places in as many as seven (7) successive cycles of data processing.

The data shown in FIGS. 13 through 16 will now be discussed in detail. FIG. 13 represents a first cycle of processing. In FIG. 13, only the end points of each separate area defining the map are determined. These end points are stored in the RAM 16. The end points are indicated in FIG. 13 by hollow circles in the center of individual pixels and dots within the pixel around the hollow circle. For example, an end point is indicated in the fifth pixel of the first row.

FIG. 14 indicates the processing which occurs in the next cycle of operation. Solid circles are indicated at the point common to four adjacent pixels in a 2×2 array. These solid circles indicate that the four pixels in such array are included in a portion of the map surviving that cycle of data processing. Certain of the solid circles have dots in the pixels surrounding the circles. These solid circles with solid dots indicate that the information is not sufficiently wide at such positions to survive another cycle of data processing. As a result, such positions are recorded with an indication that such positions have survived only the cycle of operation shown in FIG. 14.

FIG. 15 indicates the next cycle of data processing. The pixels surviving this cycle of data processing and the next cycle of data processing are indicated by hollow circles within the pixels. The pixels surviving this cycle of data processing, but not the next cycle of data processing, are represented by hollow circles with dots around the hollow circle within the pixel.

FIG. 16 represents a composite of FIGS. 13, 14 and 15. FIG. 16 further indicates by a number adjacent each hollow or solid circle the number of cycles of data processing in which the pixel survives. For example, the number "2" indicates that a pixel survives through two cycles of data processing. This number is stored in the RAM 16 since it is useful in obtaining a reconstruction of the map shown in FIG. 13.

From a review of FIGS. 12 through 16, the following important characteristics may be noted:

First of all, all survivors of arrays of 2×2 pixels are unique. In addition, each parent pixel can participate in the generation of up to four offspring. Parent pixels that are near line edges generate fewer than four offspring. Line exteriors are therefore eroded away systematically until only the key pixels on the line centers remain. In addition, line thickness is inherently indicated by the number of times the 2×2 method was applied in the successive cycles of data processing to yield the surviving key pixels. This number may be referred to as the "level".

Other important characteristics are that the gaps between key pixels are due to the rate of change of line thickness. Small gaps of one pixel are the result of digital quantizing noise and small real changes in thickness. Larger gaps than one pixel indicate large changes in thickness and further indicate that the changes in thickness occur at a relatively rapid rate. The larger gaps evident where lines have merged due to a graphical accident, or whatever, are theoretically equal to one-half of the thicker portion. This can be seen with reference to FIG. 16. In spite of quantizing noise, compound merges and thickness changes in conjunction with a line direction change, the gap still closely approximates the "one-half rule".

Other characteristics are that edge aliasing has occurred because of the unknown and assumed zero state of the pixels outside the pixel array. This effect can be eliminated by masking which will be described in a later portion of the application. No 2×2 clusters remain, thereby causing branch points such as intersecting lines to be, well defined. In tracking the key pixels for line following, a valid decision can always be made to continue picking up coordinates of the next point of a line.

Other characteristics are that all exterior (line edges) active pixel elements are eroded at the same rate, thereby leaving the survivor or key pixel elements at the center of the line, within the limits of quantizing. For lines that are orginally an even number of pixels thick, there are two pixels that straddle the midpoint, either one of which is close enough to be called the center. Edge irregularities, such as those noted in FIG. 16, eventually become survivor pixels. They are "survivor pixels" because they are recorded to indicate the edge irregularities. Such pixels can be ignored in the line following process which will utlimately take place on this surviving data base.

Other characteristics are that each surviving pixel can be thought of as representing the center of a square each of whose sides has a length equal to the pixel level number times the dimension of each pixel. The exercise of surrounding each pixel with such a square reconstructs the original pixel array exactly. If an analogy to signal analysis may be made, the 2×2 operation has redefined the input picture as a minimum series of variable sized overlapping squares whose center position and size are known and whose sum of areas exactly defines the input. A 2×2 operator reduces the input data into a unique and sufficient set of component values much in the same way a Taylor or Fourier series defines a mathematical function in terms of derivatives and simple analytical functions. The method by which the input data has been reduced into a unique and sufficient set of values is one of the major aspects of the present invention.

Other characteristics are that lines of fixed thickness will have a majority pixel population in well defined levels with possible sparser populations in a level up one and down one from the more densely populated levels. In general, line weights could be categorized by three level numbers and line discrimination is very possible as long as the candidate lines are in distinct thickness categories.

As can be seen from FIG. 16, another characteristic is that the odd level pixels have centers one half a pixel dimension out of registration with the even level counterparts. Since the odd level pixels have a center of gravity at the boundaries between adjacent pixels as shown in FIG. 14, storage of the odd level pixels can arbitrarily be done in the closest upper left pixel which will always be of the zero state and a flag bit assigned to that storage word to indicate the need to apply a correcting offset if the coordinates of those pixels need to be known to that level of accuracy in the line following process.

Although the data processing of pixels occurs in a 2×2 pixel array, line following to jump gaps in the concentrated pixel array of FIG. 3 preferably occurs in an expanded pixel array such as a 3×3 pixel array. A 3×3 array is preferably provided for line following to facilitate the jumping of gaps. As a result, the original data base has been significantly reduced to the extent that a line can be followed by looking at those key pixels within a 3×3 array to find the next point on the line, and then moving the 3×3 array analyzing window to that next key pixel and erasing the one just left. FIG. 16 has some one pixel gaps that have been created by one of the characteristics described above and the removal of those, one pixel gaps will permit the 3×3 operator to function exactly. If, however, line following is done with a 5×5 operator, then the one pixel gaps can remain.

In order to enable line following with a 3×3 operator, another 3×3 operation is applied to remove the gaps and noise, corners, etc. before the 3×3 operator for line following is activated. The 2×2 operator for data reduction has been explained above and consists of the steps also described above. The surviving pixel elements define the center of gravity of numerous squares of differing sizes whose integrated area redefine the input data exactly. The 2×2 operator has produced the reduced data base shown in FIG. 16.

The next step in the general process has been defined as Data Post Processing. A review of FIG. 16 indicates that line following could be successfully done if and end point pixel served as a start point for a local search of the neighboring active pixels to determine the next point on the line. Although large windows or searches, permit the one pixel gaps to be transparent in the determination of the next point of line following, it is more convenient to use a 3×3 array for the line following purposes, but first preceeded by another 3×3 process to clean up the key pixel array. Even through FIG. 16 illustrates a unique pixel set from which the original picture can be restructured, some pixels are not pertinent to line following, such as shown in FIG. 16. For example, isolated pixels, stubs, and corner pixels can be eliminated and more importantly, the one pixel gaps in the concentrated representation of FIG. 16 can be detected and filled by a technique of gap filling. The gap filled points are represented by a triangle in FIG. 17. Also the odd level survivors (represented by the solid circles) have been shifted from the boundaries of pixels in FIG. 17 and are represented in FIG. 17 in their top left parents position as stored in pixel RAM 16 of FIG. 2. By providing the data for the pixels represented by the triangles in FIG. 17 and by shifting the odd level survivors to their top left parents position, a representation of information in successive pixels is provided along the different lines even when the information on the map has been concentrated to the form shown in FIGS. 16 and 17.

The deletion and addition of pixels such as in the gap filling may again be done with a one bit by 512 word RAM which has been pre-loaded to include the necessary data sets and whose address lines can then monitor the serial data as shown in FIG. 3b. FIG. 17 illustrates the results of this additional clean up phase and it is obvious that the pixel data base is sufficiently continuous for a 3×3 line following method. By coding a one bit RAM by 512 words (9 address bits) and taking the serial data from a circuit arrangement such as FIG. 3b, the entire pixel array will be viewed for correction of gaps (represented by the solid triangles in FIG. 17) as each horizontal line is retrieved from the larger pixel RAM.

While the data is being processed above, it is at the same time analyzed for those pixels that have only one immediate neighbor since these elements are end points and each will be used to initiate a line following sequence that will be described in a later portion of this specification.

FIG. 18 illustrates the 9 cases for which a one bit RAM must be coded to obtain all the end points when the information such as shown in FIG. 17 is processed in successive cycles of operation to reconstruct the original map such as shown in FIG. 13. When one of the cases illustrated in FIG. 18 is detected, the address of the pixel (column and row number) in the parent pixel array, or the time slot in the serial shift register which has a direct relationship with a row/column number, is recorded in another random access memory 50 (FIG. 19). This end point memory 50 is 16 bits×4K words. The 16 bit word is required for the pixel address consisting of 8 bits for the X coordinates and 8 bits for the Y coordinate. These addresses are representively the column and row designators. The initial 256×192 pixel array may have any number of end points depending upon the picture complexity and the signal/noise ratio of the input signal and a 4K memory is deemed sufficient to store the end points for the busiest picture.

A portion of the block diagram of FIG. 2 has been expanded in FIG. 19 to show the types and numbers of serial processors that have been utilized to achieve the results as shown in FIG. 17 and also to fill the end point RAM 50.

As can be seen in FIG. 19, after the serial processing is finished the key data stored in the pixel RAM 16 (also shown in FIG. 2) is recirculated through the serial processors 14 (also shown in FIG. 2) for data analysis by the data analyser 24 (also shown in FIG. 2) in combination with other analyzing provided directly by the serial processors. As each line is allowed to go through the serial processors a 3×3 window is monitored for a pre-programmed set-up. In a first pass, the level of survival of each pixel is checked against a pre-programmed level erase RAM as shown in FIG. 19 and this provides for an override of the data for those pixels which match the pre-set levels shown in the nine (9) different examples in FIG. 18. The net result is that those key data elements which survived at pre-specified levels, are erased and the new data obtained in the cycle of data processing is substituted. This new data is now written into the pixel RAM 16 from where it is circulated for a second pass. This second pass (or cycle) provides for line-thickness discrimination (or cycle).

In the second pass (or cycle), as each line is allowed to go through the serial memory #1, as shown in FIG. 19, a gap fill RAM is enabled and it monitors the 3×3 window for a pre-programmed set-up. Specifically, the gap fill RAM is programmed for a set-up such that it modifies the contents of the serial memory #1 to create the effect of filling one pixel gaps and passes on the data to serial memory #2 where a corner, stub and isolation suppress RAM eliminates the corners, stubs and isolations is encounters in accordance with its pre-programmed sequence. In other words, since the corner, stub and isolation suppress RAM has been preprogrammed, during the simplification and concentration represented by FIGS. 13 through 17, in accordance with the contour of the map shown in FIG. 13, such RAM can now operate to eliminate such corners, stubs and isolations during the reconstructions of such map.

In the next pass, a branch point search is enabled and the window is monitored by the branch point RAM shown in FIG. 19 and the key data is overridden to tag the branch points when the branch point RAM encounters the proper preprogrammed set-up. After the data is tagged for the branch points, an X-Y mask RAM, as shown in FIG. 19, is allowed to override the data to create the effect of masking the boundaries and leaving a central 160×160 pixel array.

At this point, the data is now allowed one more pass through the serial processors and at this time the window is monitored by an end point RAM as shown in FIG. 19, and when the proper sequence is encountered, a corresponding X-Y address is written to an end point stack also shown in FIG. 19 for later use in line following.

The next step in the process is line vectorizing, using the line vectorizing hardware 44 as shown in FIG. 2. The key data which has been stored in the pixel RAM 16 is now ready for line vectorizing. Specifically, an end point from the end point stack shown in FIG. 19, is picked and the line following is initiated from the picked end point. When the line follow is enabled, the starting pixel may be written into a memory such as a 24 bit 4K memory included in the line vectorizing hardware 44. This memory may be designated as a line RAM. Eight bits for each of the X and Y addresses, is used and with a remaining eight bits used to represent the Z attribute. The Z attribute may be the level at which the pixels survived or may represent a branch point tag or may represent an end point tag. The first step in the line vectorizing sequence is to write the end point into the line RAM. The next step is to retrieve the neighboring eight pixels to analyze the 3×3 window. Once the 3×3 window is ready, a decision is made about the direction in which to step.

Normally, there should be only one possible stepping direction since the "corners" have been previously eliminated. However, if there is a choice, the line vectorizing hardware includes a hardware priority encoder so as to make that decision, and the line following sequence then applies the corresponding X and Y stepping increments depending on that direction so as to update the addresses and enable viewing the next 3×3 window. After a step decision has been made, the center pixel of the 3×3 array is erased from the pixel RAM 16. However, if that center pixel corresponds to a branch point, then it is written into the line RAM as is any other point but it will not be erased from the pixel RAM.

The new 3×3 array is now addressed by the logic and the process of building up the line RAM and exhausting the pixel RAM continued until an end point is encountered.

On encountering an end point in the line vectorizing hardware, an end point signal is generated which in turn terminates this line following phase and also tags this end point by modifying the Z attribute which has already been written into the line RAM. A branch point also terminates a line follow sequence but the Z attribute is not modified since it is already coded as a branch point in the post-processing phase.

Termination of a line following phase is detected by the Linetrac CPU 30, shown in FIG. 2, which is continuously monitoring the line-follow status. The next line-follow phase is initiated by looking at the next point in the end point RAM and if the pixel state is non-zero (i.e. not yet been vectorized), then another line follow phase is started. In this manner all the lines between an end point and a branch point, between two end points, or between two branch points are vectorized.

After the above-mentioned mechanical process, the pixel RAM should be completely zeroed. Special cases, such as closed line segments within the pixel array, necessitate slight modifications to the line start sequence of the line vectorizing process. It is sufficient to say that the line vectorizing hardware exhausts the pixel RAM to an all zero state while building linear strings of X-Y coordinates in the line RAM. At the end of the vectorizing process, an interrupt is generated to let the host computer know that the data is ready. The host computer then receives the line data and writes the data either on the disc or magnetic tape or whatever type of storage medium is used.

From the particular example described in this application, the theoretical maximum number of key pixels in any array is 14,364. This maximum number happens for a grid pattern type of input. To cover such a patch, the line RAM which is part of the line vectorizing hardware 44, should be at least 14,364 words, but in practice it is expected that the data will not exceed 4,096 key elements. However, it is to be appreciated that if the need arises, more memory may always be added to the system.

To replay this information from the original input only the X-Y addresses of the start point, end point, and intermediate inflection points are necessary. This means that in the line follow phase, those points that do not contribute to a net change in direction can be discarded. In this way, a 20%-40% data reduction without any loss of resolution can be achieved. This secondary data reduction can be achieved in the line vectorizing phase by the line vectorizing hardware 44, by using a directional technique. For the particular example considered in FIGS. 12 through 16, the results of the line following phase may be shown in FIGS. 20 and 21.

Figure 20:
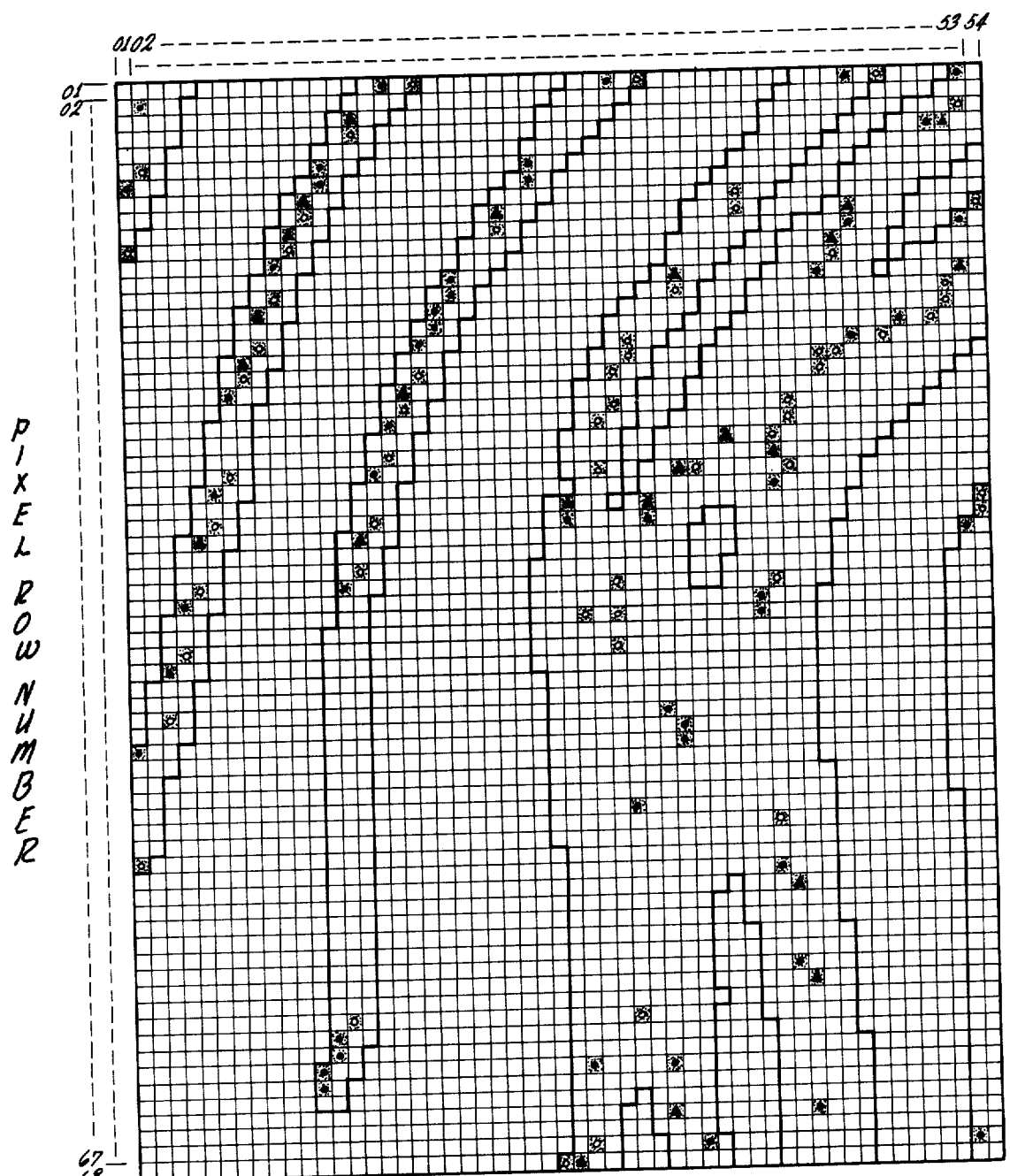
FIG. 20 illustrates the results of the line following phase.

The elimination of superfluous information may be seen by a comparison of FIGS. 17 and 20. For example, all of the information appearing in a vertical column and having the same weight or significance can be eliminated except for the information in the uppermost and lowermost pixels in the column. By way of illustration, all of the solid circles in column 1 can be eliminated except for the two solid circles in column 1 of FIG. 20. The two solid triangles (representing fill-ins in gaps in the concentrated information) in FIG. 17 can also be eliminated, as may be seen by comparing FIGS. 17 and 20.

Figure 21:
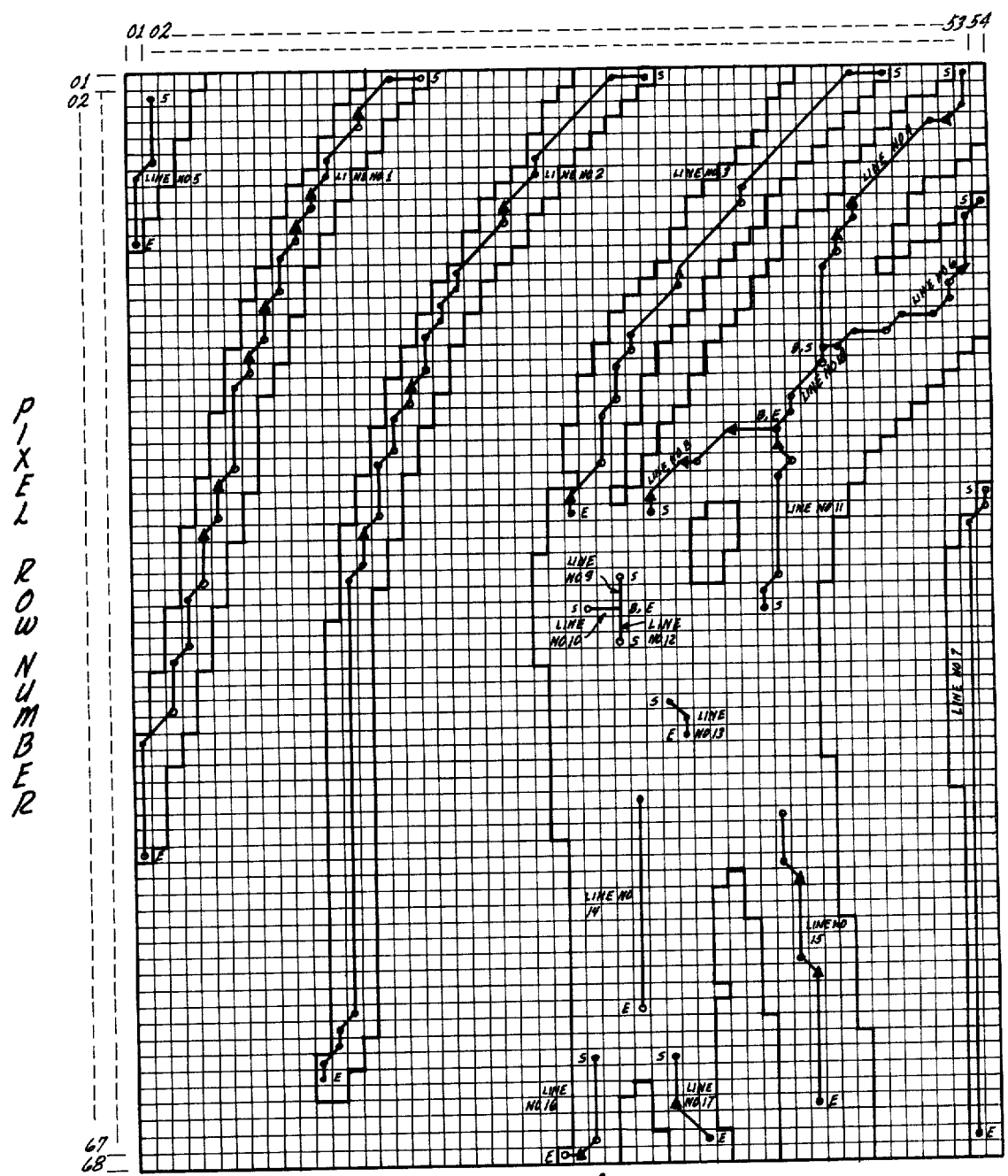
FIG. 21 illustrates the plotted output from the points shown in FIG. 20.
Figure 22:
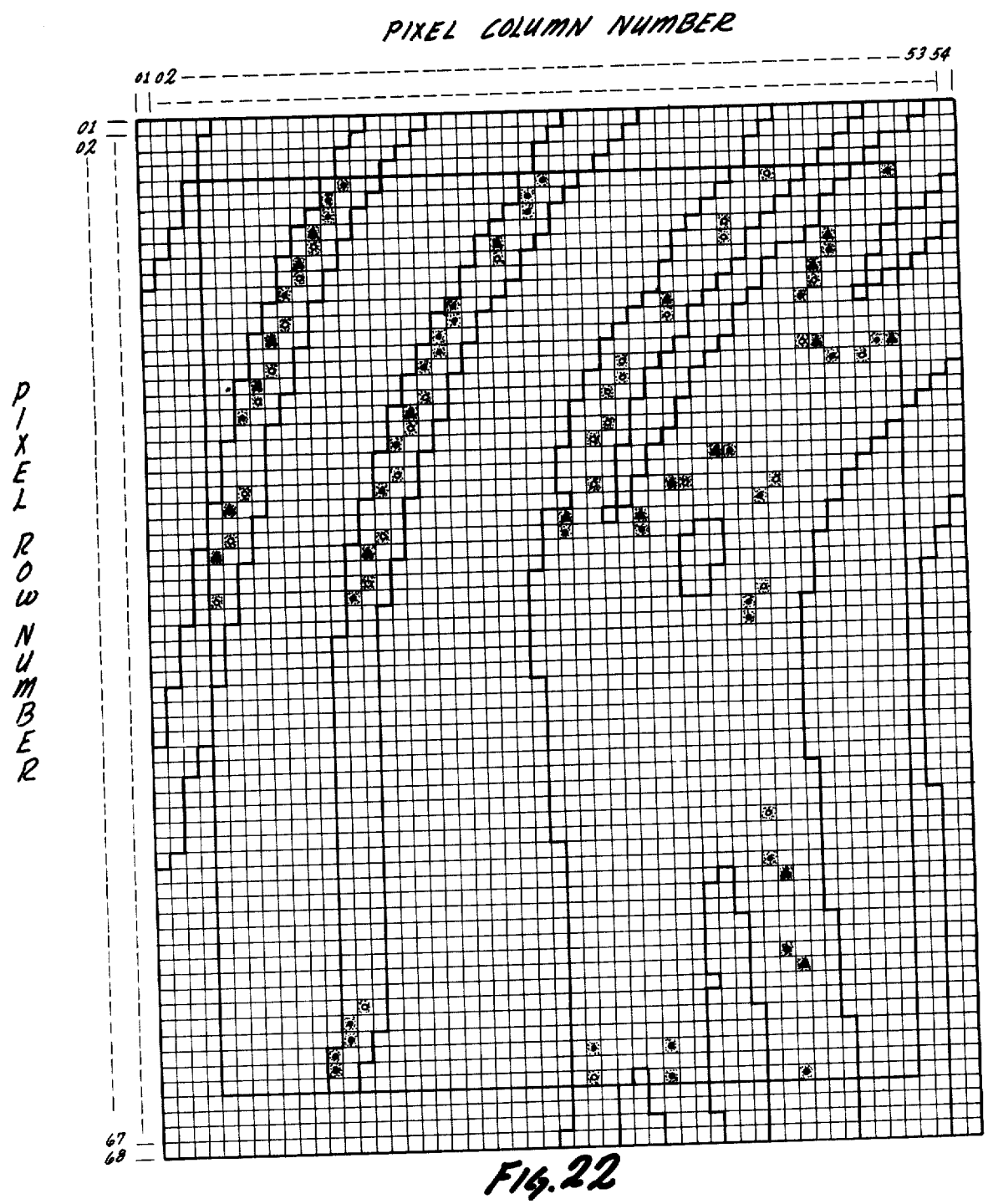
FIG. 22 illustrates the results of the line following phase with an imposed masking and line weight discrimination.

As shown in FIG. 21, the lines are numbered in the order in which they will be picked up. Start points are shown with an "S" and the branch points are shown with a "B" and the end points are shown with an "E". The pixels shown in FIG. 20 are the ones retained after data screening and are central to represent the line without any loss of resolution. When these points are plotted, the output is shown in FIG. 21 where the successive points in a line are joined by a straight line. In FIGS. 20 and 21, the masking and erase level effects have not been invoked. For example, by imposing the masking of four rows and four columns on all sides, and programming the level erase RAM to delete any level that survived a level eight, or greater, the results will be as shown in FIGS. 22. The corresponding output line plot is then shown in FIG. 23.

Figure 23:
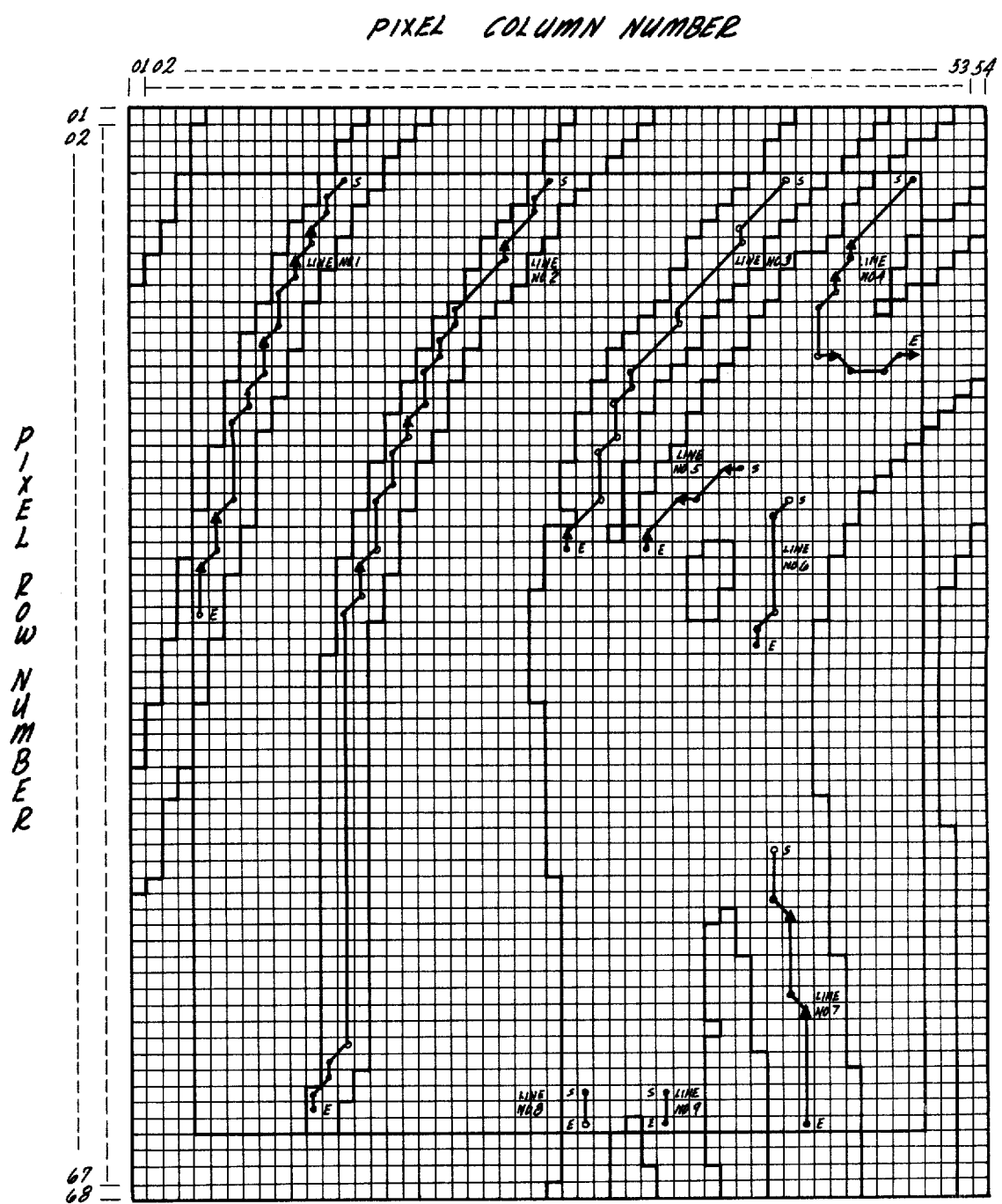
FIG. 23 illustrates the plotted output from the points shown in FIG. 22.

As will be appreciated, the mapping area (or patch) shown in FIG. 22 represents a portion of a complete map. In order to reconstruct the complete map, different mapping areas (or patches) of the map are reconstructed in the manner discussed above. Each of the mapping areas (or patches) has an overlap at its boundaries with the adjacent mapping areas (or patches). This overlap is represented by a distance of four (4) pixels along the horizontal and vertical borders of each mapping area (or patch). This overlap is shown in FIGS. 22 and 23 and is designated in FIG. 22 as a "masking level". By eliminating such borders and disposing the different mapping areas in adjacent relationship, the map can be reconstructed.

As the line data is transferred to the storage such as a magnetic tape or disc, the next picture segment may be viewed. The transports may then be moved to the next patch and all of the steps described above are repeated successively from patch to patch until the whole image has been processed. The data bases generated for each patch may be later married so as to create a single data base where the X-Y addresses are with reference to a point on a larger drawing rather than with reference to their respective patch origins. But the processing on a patch-by-patch basis allows for the advantages of the present invention.

Although the application has been described with reference to a particular embodiment, it is to be appreciated that various adaptations and modifications may be made and the invention is only to be limited by the appended claims.

I claim:

1. A method of providing a digital representation of graphic information on a document wherein the document has been scanned and a signal representative of the graphic information at progressive pixel points on the document has been generated, including the following steps storing the signal representative of the graphic information in a memory device through an input path, retrieving the signal representative of the graphic information and feeding the signal through the input path and back to the memory device, providing serial processing and data analysis to the signal representative of the graphic information on a reiterative basis as the signal is repeatably stored and retrieved and with the serial processing and data analysis including the following steps, providing pixel arrays from pluralities of adjacent pixels and providing data reduction to center elements, during the serial processing and data analysis, when the pixel arrays have desired characteristics and with all of the graphic information in the signal concentrated to center elements in accordance with the pixel arrays and with surviving pixels which are not part of an array stored and an attribute representative of the level of survival also stored with the surviving pixels, repeating the above step on a reiterative basis using the surviving center elements from the previous step to form the pixel arrays until there are no more surviving pixel arrays so that the stored surviving pixels and their attributes represent the centroids of the lines of the graphic document and the attributes represent the thickness of the lines, and providing pixel arrays from the stored surviving pixels and comparing the pixel arrays with fixed criteria for providing gap filling and elimination of undesired pixels.

2. The method of claim 1 wherein the steps of data reduction are provided by 2×2 pixel arrays and the center elements are produced at the center of the 2×2 pixel arrays.

3. The method of claim 1 wherein the step of comparing the stored surviving pixel with fixed criteria is provided by 3×3 pixel arrays.

4. The method of claim 1 including the following additional step of initially subdividing each progressive pixel point into a plurality of smaller areas and basing an assignment of a one or a zero state to the pixel in accordance with a predetermined threshold number of the areas with the one or zero state.

5. The method of claim 1 including the following additional step of subdividing the graphic document into overlapping patches and processing the complete patch including the overlapping portions of adjacent patches but storing only the center non-overlapping patch portions.

6. The method of claim 1 including the following additional steps for line following retrieving the stored surviving pixels after gap filling and elimination of undesired pixels and providing pixel arrays,
   identifying the end points and branch points in the arrays and storing the end points in a stack,
   retrieving individual end points and following each line until an end point or a branch point is met until all the lines between an end point and a branch point or between two end or branch points are followed.

7. The method of claim 6 wherein the step of providing pixel arrays for line following is provided by 3×3 pixel arrays.

8. The method of claim 7 wherein the memory device is shared between two operations' repetitive cycles so that in one cycle the memory device provides serial processing and data analysis and in the other cycle the memory device provides line following.

9. The method of claim 1 wherein the memory device is a random access memory.

10. The method of claim 1 additionally including the step of visually monitoring the signal in the output path from the memory device.

11. The method of claim 1 additionally including the steps of analyzing the stored surviving pixels for end points and branch points and storing the end points and branch points.

12. The method of claim 1 additionally including the step of erasing surviving pixels having a survival level equal to predetermined levels.

13. The method of claim 1 additionally including the step of providing a digitizing of the signal representing the graphic information when the signal has varying levels.

14. Apparatus for providing a digital representation of graphic information on a document and wherein the document is scanned and a signal representative of the graphic information at progressive pixel points on the document is generated, including means for storing through an input path the signal representative of the graphic information in a memory device, means for retrieving through an output path the signal representative of the graphic information and for feeding the signal through the input path and back to the memory device,
   means for providing serial processing and data analysis to the signal representative of the graphic information on a reiterative basis as the signal is repeatedly stored and retrieved and with the serial processing and data analysis including
   means for providing pixel arrays from pluralities of adjacent pixels and for providing data reduction to elements when the pixel arrays have desired characteristics and with all of the graphic information in the signal reduced to center elements in accordance with the pixel arrays and with surviving pixels which are not part of an array stored and an attribute representative of the level of survival also stored with the surviving pixels, and
   means for repeating the above on a reiterative basis using the surviving center elements from the previous process to form the pixel arrays until there are no more surviving pixel arrays so that the stored surviving pixels and their attributes represent the centroids of the lines of the graphic document and the attributes represent the thickness of the lines.

15. The apparatus of claim 14 additionally including means for providing pixel arrays from the stored surviving pixels and comparing the pixel arrays with fixed criteria for providing gap filling and elimination of undesired pixels.

16. The apparatus of claim 15 wherein the means for comparing the stored surviving pixel with fixed criteria include 3×3 pixel arrays.

17. The apparatus of claim 14 wherein the means for providing data reduction include 2×2 pixel arrays and the center elements are produced at the center of the 2×2 pixel arrays.

18. The apparatus of claim 14 further including means for initially subdividing each progressive pixel point into a plurality of smaller areas and for basing an assignment of a one or a zero state to the pixel in accordance with a predetermined threshold number of the areas with the one or zero state.

19. The apparatus of claim 14 further including means for subdividing the graphic document into overlapping patches and processing the complete patch including the overlapping portions of adjacent patches and for storing only the center non-overlapping patch portions.

20. The apparatus of claim 14 further including means for line following including
   means for retrieving the stored surviving pixels and for providing pixel arrays,
   means for identifying the end points and branch points in the arrays and storing the end points in a stack, and
   means for retrieving individual end points and following each line until an end point or a branch point is met until all the lines between an end point and a branch point or between two end or branch points are followed.

21. The apparatus of claim 20 wherein the means for providing pixel arrays for line following includes 3×3 pixel arrays.

22. The apparatus of claim 20 wherein the memory device is shared between two operational repetitive cycles so that in one cycle the memory device provides serial processing and data analysis and in the other cycle the memory device provides line following.

23. The apparatus of claim 14 wherein the memory device is a random access memory.

24. The apparatus of claim 14 additionally including means for visually monitoring the signal in the output path from the memory device.

25. The apparatus of claim 14 additionally including means for analyzing the stored surviving pixels for end points and branch points and storing the end points and branch points.

26. The apparatus of claim 14 additionally including means for erasing surviving pixels having a survival level equal to predetermined levels.

27. The apparatus of claim 14 additionally including means for providing a digitizing of the signal representing the graphic information when the signal has varying levels.

* * * * *